US008744498B2

(12) United States Patent
Sawaki et al.

(10) Patent No.: US 8,744,498 B2
(45) Date of Patent: Jun. 3, 2014

(54) CORDLESS COMMUNICATION SYSTEM

(75) Inventors: Yukichi Sawaki, Nagoya (JP); Keiichi Matsunaga, Seto (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 1529 days.

(21) Appl. No.: 11/964,617

(22) Filed: Dec. 26, 2007

(65) Prior Publication Data
US 2008/0161024 A1 Jul. 3, 2008

(30) Foreign Application Priority Data

Dec. 27, 2006 (JP) ................................. 2006-352326

(51) Int. Cl.
*H04Q 7/20* (2006.01)
(52) U.S. Cl.
USPC ...................................... 455/462; 455/552.1
(58) Field of Classification Search
USPC ............... 455/41.2, 74.1, 402, 458, 462, 572, 455/573, 754, 552.1
See application file for complete search history.

(56) References Cited

U.S. PATENT DOCUMENTS

| 5,519,762 | A * | 5/1996 | Bartlett | 455/574 |
| 6,856,799 | B1 * | 2/2005 | Ritter | 455/402 |
| 2003/0032445 | A1 * | 2/2003 | Suwa | 455/552 |
| 2004/0203481 | A1 * | 10/2004 | Park et al. | 455/74.1 |
| 2004/0235537 | A1 * | 11/2004 | Koga et al. | 455/574 |
| 2005/0227734 | A1 | 10/2005 | Euscher | |

FOREIGN PATENT DOCUMENTS

| DE | 102004021341 A1 | 11/2005 |
| EP | 1458110 A2 | 9/2004 |
| EP | 1715664 A1 | 10/2006 |
| JP | H05-083335 A | 4/1993 |
| JP | H06-338838 A | 6/1994 |
| JP | H08-204791 A | 8/1996 |
| JP | H11-155000 A | 6/1999 |
| JP | 2003-174382 A | 6/2003 |
| JP | 2005-197919 A | 7/2006 |

OTHER PUBLICATIONS

European Patent Office; European Search Report in European Patent Application No. 07025147.5 (counterpart to the above-captioned U.S. patent application (mailed Mar. 23, 2010).
Japan Patent Office; Office Action in Japanese Patent Application No. 2006-352326 (mailed Feb. 23, 2010).

* cited by examiner

Primary Examiner — Myron K Wyche
(74) Attorney, Agent, or Firm — Baker Botts L.L.P.

(57) ABSTRACT

A cordless communication system includes a base unit and a handset. The base unit is connectable to a communication line. The handset includes a handset wireless communicating unit, a handset communicating unit, a handset switching unit, and a handset starting unit. The handset wireless communicating unit implements wireless communications with the base unit wireless communicating unit. The handset communicating unit is capable of communicating signals with the base unit. The handset switching unit switches between a handset normal mode in which power is supplied to the handset wireless communicating unit and a handset power-saving mode in which power to the handset wireless communicating unit is interrupted. The handset starting unit controls the handset switching unit to supply power to the handset wireless communicating unit in order to switch to the handset normal mode from the handset power-saving mode if the handset communicating unit receives a handset start signal instructing the handset to cancel the handset power-saving mode during the handset power-saving mode.

12 Claims, 11 Drawing Sheets

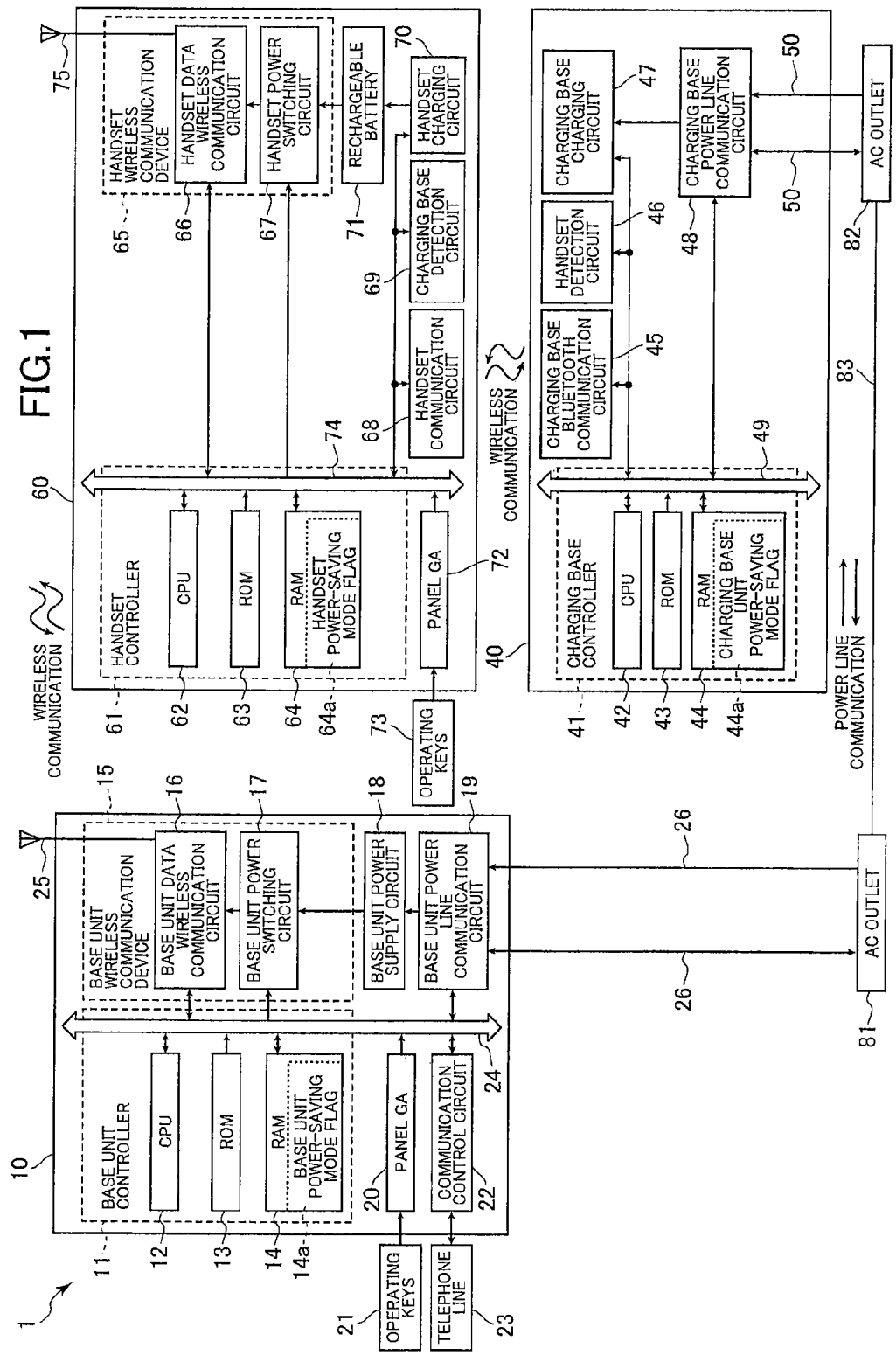

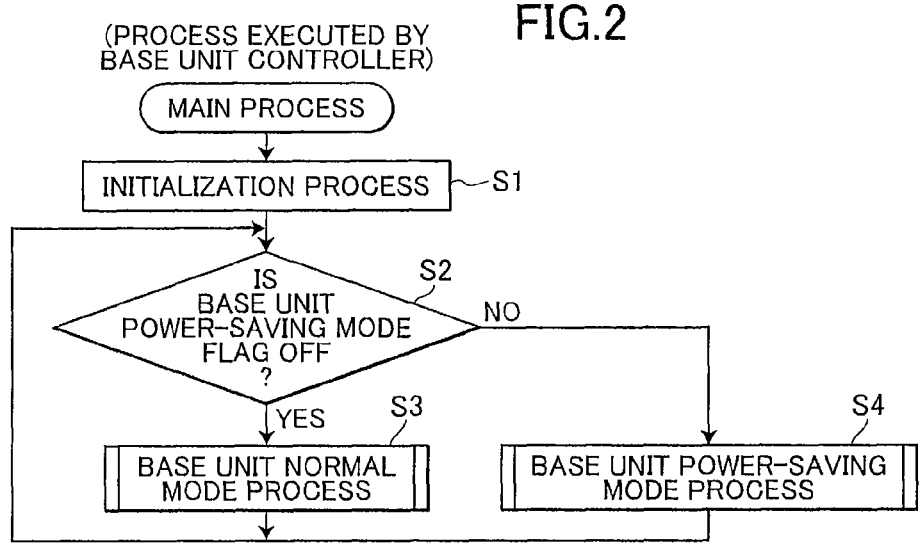
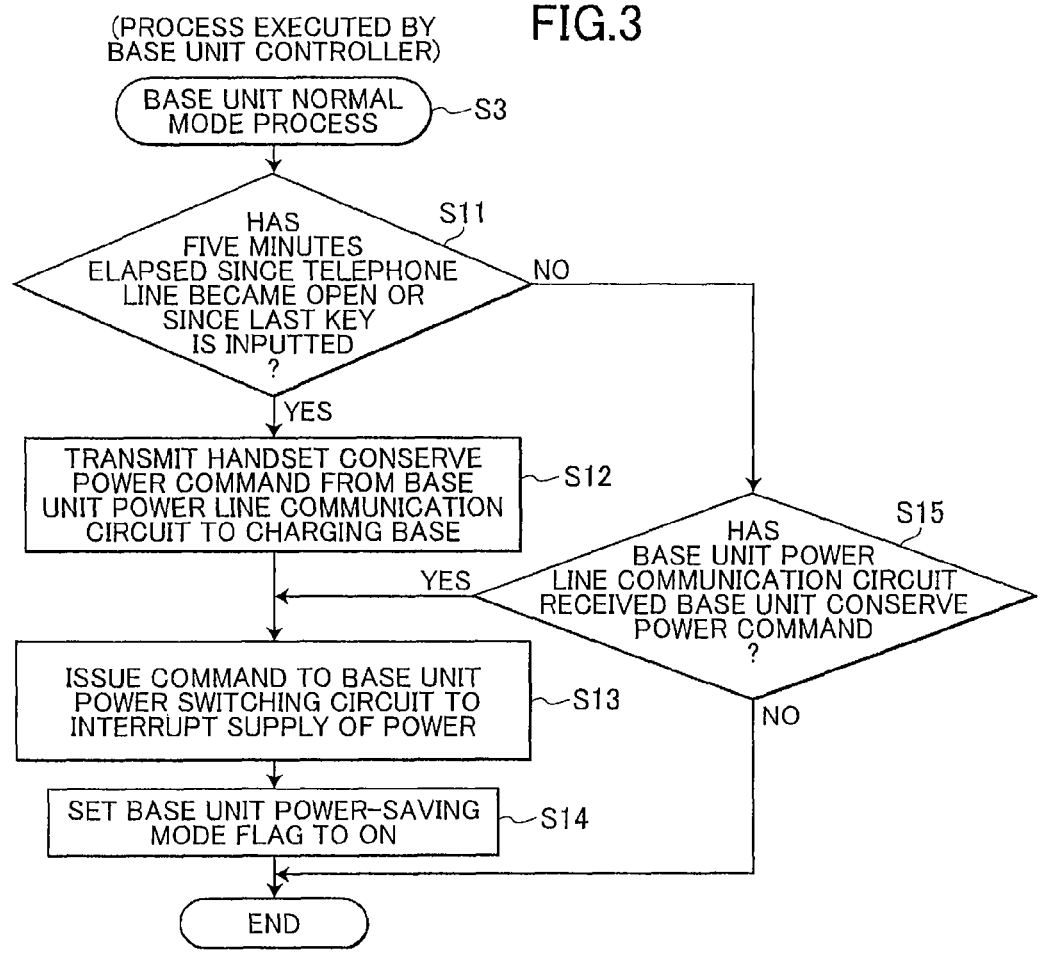

CORDLESS COMMUNICATION SYSTEM

CROSS REFERENCE TO RELATED APPLICATIONS

This application claims priority from Japanese Patent Application No. 2006-352326 filed Dec. 27, 2006. The entire content of each of these priority applications is incorporated herein by reference.

TECHNICAL FIELD

The present invention relates to a cordless communication system, and particularly to a cordless communication system capable of reducing power consumption in a power-saving mode designed to use less power than a normal operating mode.

BACKGROUND

A cordless communication system, such as a telephone system capable of performing wireless communication between a base unit and a handset, is well known in the art. One such cordless communication system is a cordless telephone system employing digital modulation described in Japanese patent application publication No. 6-338838. This digital modulation cordless telephone system includes a base unit and a handset, both of which are configured to return to a standby state after communication between the base unit and handset ends. After the base unit and the handset return to the standby state, the base unit periodically transmits data to the handset, and the handset periodically receives the transmitted data. The handset also transmits response data to the base unit upon receiving data from the base unit. Hence, the cordless telephone system disclosed in Japanese patent application publication No. 6-338838 periodically exchanges data between the base unit and the handset.

The digital modulation cordless telephone system described above generally employs frequency-hopping spread spectrum, periodically changing the frequency at which signals are exchanged between the base unit and the handset. Therefore, the base unit and the handset must periodically exchange data in order to always maintain the same frequency for communications. By periodically exchanging data between the base unit and handset, as described above, when the base unit detects an incoming call on a public line and transmits incoming call data to the handset, the handset can instantaneously receive the transmitted call data.

SUMMARY

However, since the base unit and handset periodically send and receive data while in the standby state in the cordless telephone system described above, it is necessary to supply power to transceivers in the base unit and handset for exchanging this data.

In view of the foregoing, it is an object of the present invention to provide a cordless communication system capable of reducing power consumption in a power-saving mode designed to use less power than in the normal mode.

In order to attain the above and other objects, the invention provides a cordless communication system. The cordless communication system includes a base unit and a handset. The base unit is connectable to a communication line. The base unit has a base unit wireless communicating unit implementing wireless communications. The handset includes a handset wireless communicating unit, a handset communicating unit, a handset switching unit, and a handset starting unit. The handset wireless communicating unit implements wireless communications with the base unit wireless communicating unit. The handset communicating unit is capable of communicating signals with the base unit. The handset switching unit switches between a handset normal mode in which power is supplied to the handset wireless communicating unit and a handset power-saving mode in which power to the handset wireless communicating unit is interrupted. The handset starting unit controls the handset switching unit to supply power to the handset wireless communicating unit in order to switch to the handset normal mode from the handset power-saving mode if the handset communicating unit receives a handset start signal instructing the handset to cancel the handset power-saving mode during the handset power-saving mode.

According to another aspects, the invention provides a cordless communication system. The cordless communication system includes a handset and a base unit. The handset has a handset wireless communicating unit which implements wireless communications. The base unit is connectable to a communication line. The base unit includes a base unit wireless communicating unit, a base unit communicating unit, a base unit switching unit, and a base unit starting unit. The base unit wireless communicating unit implements wireless communications with the handset wireless communicating unit. The base unit communicating unit is capable of communicating signals with the handset. The base unit switching unit switches between a base unit normal mode in which power is supplied to the base unit wireless communicating unit and a base unit power-saving mode in which power to the base unit wireless communicating unit is interrupted. The base unit starting unit controls the base unit switching unit to supply power to the base unit wireless communicating unit in order to switch to the base unit normal mode from the base unit power-saving mode if the base unit wireless communicating unit has received a base unit start signal instructing the base unit to cancel the base unit power-saving mode.

BRIEF DESCRIPTION OF THE DRAWINGS

In the Drawings:

FIG. 1 shows the electrical structure of a cordless communication system;

FIG. 2 is a flowchart illustrating steps in a main process executed by the base unit controller of the base unit;

FIG. 3 is a flowchart illustrating steps in a base unit normal mode process executed by the base unit controller of the base unit;

DETAILED DESCRIPTION

First Embodiment

Figure 4:
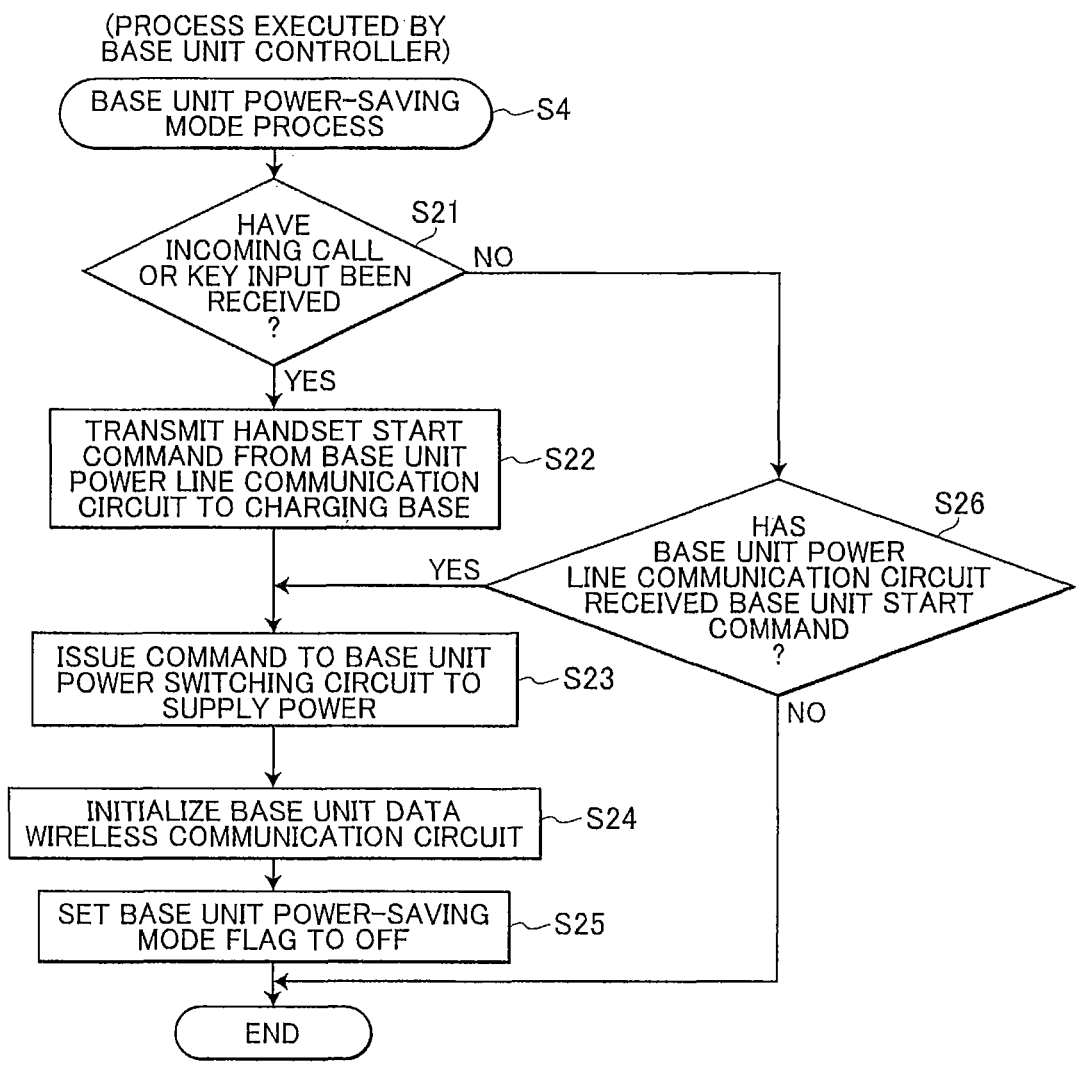
FIG. 4 is a flowchart illustrating steps in a base unit power-saving mode process executed by the base unit controller of the base unit.

Next, a first embodiment of the present invention will be described while referring to the accompanying drawings. FIG. 1 shows an electrical structure of a cordless communication system 1. The cordless communication system 1 includes a base unit 10, a handset 60 configured to communicate wirelessly with the base unit 10 through the frequency-hopping spread spectrum technique, and a charging base 40 for charging the handset 60 when the handset 60 is mounted thereon. The base unit 10 is connected to the charging base via an AC outlet 81, a commercial power line 83, and an AC outlet 82. The following description will first cover the structure of the base unit 10, followed by the charging base 40, and finally the handset 60, while referring to FIG. 1.

The base unit 10 functions both to communicate wirelessly with the handset 60 through the frequency-hopping spread spectrum technique and to use the commercial power line 83 to communicate with the charging base 40 through power-line communications (power-line carrier). As shown in FIG. 1, the base unit 10 includes a base unit controller 11, a panel gate array (hereinafter referred to as "panel GA") 20, an operating keys 21, a communication control circuit 22, a base unit wireless communication device 15, a base unit power supply circuit 18, a base unit power line communication circuit 19, and an AC power cord 26. The base unit wireless communication device 15 further includes a base unit data wireless communication circuit 16, a base unit power switching circuit 17, and an antenna 25.

The base unit controller 11 controls the base unit wireless communication device 15, the base unit power line communication circuit 19, and the communication control circuit 22 through a bus line 24 and receives signals is outputted from the panel GA 20 through the bus line 24. The base unit controller 11 is primarily configured of a CPU 12, a ROM 13, and a RAM 14.

The CPU 12 is an arithmetic unit for controlling each component of the base unit 10. The ROM 13 is a non-writable, nonvolatile memory for storing control programs executed by the CPU 12 (an example of which is illustrated by flowcharts in FIGS. 2 through 4) and various commands transmitted to the handset 60 (a handset conserve power command and a handset start command). The RAM 14 temporarily stores various data when the CPU 12 executes the control programs.

The RAM 14 includes a base unit power-saving mode flag 14a. The base unit power-saving mode flag 14a indicates whether the power mode of the base unit 10 is a normal mode for supplying power to the base unit data wireless communication circuit 16 of the base unit 10 or a power-saving mode for interrupting the supply of power to the base unit data wireless communication circuit 16. The base unit power-saving mode flag 14a is initially set to OFF in an initialization step (see S1 of FIG. 2) executed when power is supplied to the base unit 10. The base unit power-saving mode flag 14a is subsequently set to ON or OFF based on subsequent steps. When the base unit power-saving mode flag 14a is set to OFF, the CPU 12 determines that the base unit 10 is in the normal mode. However, when the base unit power-saving mode flag 14a is set to ON, the CPU 12 determines that the base unit 10 is in the power-saving mode.

The CPU 12, the ROM 13, and the RAM 14 are interconnected via the bus line 24. Accordingly, after power to the base unit 10 is switched on, the CPU 12 reads the control program from the ROM 13 and executes the program. Further, the CPU 12 temporarily stores various data in the RAM 14 while executing the control program and performs various control processes while reading this data from the RAM 14.

The panel GA 20 functions to detect desired commands inputted with the operating keys 21. The panel GA 20 is connected to the operating keys 21 through a bus line and is also connected to the bus line 24. When a user operates the operating keys 21, the panel GA 20 detects the operated keys and outputs detection signals to the bus line 24 based on the operated keys. The CPU 12 receives detection signals outputted by the panel GA 20.

The communication control circuit 22 modulates and demodulates signals to implement communications with a telephone line 23. The communication control circuit 22 is connected to the telephone line 23 via a communication line and is also connected to the bus line 24. When an incoming call is received on the telephone line 23, the communication control circuit 22 receives the signals from the telephone line 23. The communication control circuit 22 then demodulates the received signal and outputs the results to the bus line 24 to be received by the CPU 12. The communication control circuit 22 also modulates signals inputted by the CPU 12 through the bus line 24 and transmits the modulated signals to the telephone line 23.

The base unit wireless communication device 15 functions to perform wireless communications with the handset 60 through the frequency-hopping spread spectrum technique. The base unit data wireless communication circuit 16 is integrally configured of a transmission device (not shown) for converting data to be transmitted into a high-frequency current signal and for transmitting this signal to the antenna 25, and a reception device (not shown) for extracting required data from a high-frequency current signal received by the antenna 25. The base unit data wireless communication circuit 16 is also provided with an oscillator circuit for outputting an oscillating signal, an amplifier circuit for amplifying the signal.

The base unit data wireless communication circuit 16 is connected to the antenna 25 and to the bus line 24 through a bus line. The base unit data wireless communication circuit 16 is also connected to the base unit power switching circuit 17 by a power feed line (indicated by an arrow with a bold point). When the CPU 12 inputs a signal (a voice signal or command, for example) to the base unit data wireless communication circuit 16 via the bus line 24, the base unit data wireless communication circuit 16 converts this signal into a high-frequency current signal, which is emitted from the antenna 25. On the other hand, when a high-frequency current signal is received by the antenna 25, the base unit data wireless communication circuit 16 extracts the necessary voice signal, command, or the like from the inputted current signal and outputs this extracted signal to the bus line 24 to be received by the CPU 12. The base unit data wireless communication circuit 16 is powered by electricity supplied from the base unit power switching circuit 17. Hence, if the power supply from the base unit power switching circuit 17 is interrupted and the base unit 10 shifts from the normal mode into the power-saving mode, the base unit data wireless communication circuit 16 is incapable of performing wireless communications.

The base unit power switching circuit 17 functions to switch the power supply to the base unit data wireless communication circuit 16 on and off. The base unit power switching circuit 17 is connected to the base unit data wireless communication circuit 16 by a power feed line (indicated by an arrow with a bold point). The base unit power switching circuit 17 also connected to the base unit power supply circuit 18 by a power feed line (indicated by an arrow with a bold point). The base unit power switching circuit 17 is connected to the bus line 24 via a bus line. When the CPU 12 inputs a command to the base unit power switching circuit 17 via the bus line 24 for interrupting the power supply, the base unit power switching circuit 17 interrupts the power supplied from the base unit power supply circuit 18 to the base unit data wireless communication circuit 16, shifting the base unit 10 from the normal mode to the power-saving mode. In the embodiment, the base unit power switching circuit 17 is configured to interrupt this power supply if five minutes has elapsed after the telephone line has been opened or if five minutes has elapsed after any key input via the operating keys 21. That is, the base unit power switching circuit 17 is configured to interrupt this power supply if five minutes has elapsed since later one of a time when the telephone line has been opened and a time when the last key has been inputted via the operating key 21. Or, the base unit power switching circuit 17 is configured to interrupt this power supply if the base unit power line communication circuit 19 receives a base unit conserve power command for shifting the base unit 10 from the normal mode to the power-saving mode.

On the other hand, if the CPU 12 inputs a power supply command to the base unit power switching circuit 17 via the bus line 24, the base unit power switching circuit 17 supplies power from the base unit power supply circuit 18 to the base unit data wireless communication circuit 16, shifting the base unit 10 from the power-saving mode back to the normal mode. That is, the power supply command inputted by the CPU 12 instructs the base unit power switching circuit 17 to supply power to the base unit data wireless communication circuit 16 from the base unit power supply circuit 18. The base unit power switching circuit 17 begins supplying power from the base unit power supply circuit 18 to the base unit data wireless communication circuit 16 when an incoming call is received on the telephone line 23, or when key input is received on the operating keys 21, or when the base unit power line communication circuit 19 receives a base unit start command for shifting the base unit 10 from the power-saving mode to the normal mode.

The base unit power supply circuit 18 functions to supply power to the base unit data wireless communication circuit 16. The base unit power supply circuit 18 is connected to the base unit power switching circuit 17 through the power feed line (indicated by an arrows with a bold point). The base unit power supply circuit 18 is also connected to the base unit power line communication circuit 19 through a power feed line (indicated by an arrow with a bold point). The base unit power supply circuit 18 sets power supplied from the base unit power line communication circuit 19 to a prescribed amount and supplies this power to the base unit power switching circuit 17.

The base unit power line communication circuit 19 is connected to the AC power cord 26 and is connected to the bus line 24 via a bus line. The base unit power line communication circuit 19 is also connected to the base unit power supply circuit 18. The base unit power line communication circuit 19 performs power line communications by transferring and receiving commands via the AC power cord 26. Accordingly, data transmitted and received by the base unit power line communication circuit 19 includes only commands and not voice signals. The AC power cord 26 is connected to the base unit power line communication circuit 19. The AC power code 26 is further connected to the AC outlet 81 configured of a commercial power outlet. The base unit power line communication circuit 19 receives a power supply from the AC power cord 26 at all times, regardless of whether the base unit 10 is in the normal mode or the power-saving mode. Here, in FIG. 1, the function to supply power to the base unit power line communication circuit 19 is indicated a line with an arrow at one end, and the function to transmit commands between the base unit power line communication circuit 19 and the AC outlet 81 is indicated by a line with arrows at both ends. Therefore, the base unit power line communication circuit 19 can transmit and receive commands at all times. The commercial power line 83 is connected to the AC outlets 81, 82.

When the CPU 12 inputs a command to the base unit power line communication circuit 19 via the bus line 24, the base unit power line communication circuit 19 modulates the inputted command according to the power line carrier method and transmits the modulated command along the AC power cord 26. Commands transmitted along the AC power cord 26 are outputted to the commercial power line 83 via the AC outlet 81 and conveyed to the AC outlet 82. Commands transmitted from the base unit power line communication circuit 19 include a handset start command for shifting the handset 60 from a power-saving mode to a normal mode, and a handset conserve power command for shifting the handset 60 from the normal mode to the power-saving mode.

On the other hand, when the base unit power line communication circuit 19 receives a command via the AC power cord 26, the base unit power line communication circuit 19 demodulates the command and outputs the demodulated command to the bus line 24 to be received by the CPU 12. The base unit power line communication circuit 19 receives power supplied from the AC power cord 26 and supplies this power to the base unit power supply circuit 18. Commands received by the base unit power line communication circuit 19 include the base unit start command and the base unit conserve power command.

Next, the charging base 40 will be described. The charging base 40 functions to charge the handset 60 when the handset 60 is mounted thereon and to relay commands between the base unit 10 and the handset 60. As shown in FIG. 1, the charging base 40 includes a charging base controller 41, a charging base Bluetooth communication circuit 45, a handset detection circuit 46, a charging base charging circuit 47, a charging base power line communication circuit 48, and an AC power cord 50.

The charging base controller 41 functions to control the charging base Bluetooth communication circuit 45, the handset detection circuit 46, the charging base charging circuit 47, and the charging base power line communication circuit 48 via a bus line 49. The charging base controller 41 includes a CPU 42, a ROM 43, and a RAM 44.

The CPU 42 is an arithmetic unit for controlling each component of the charging base 40. The ROM 43 is a nonwritable, nonvolatile memory for storing control programs executed by the CPU 42 (an example of which is illustrated by flowcharts in FIGS. 5 through 7), a command transmitted to the base unit 10 (a base unit conserve power command) and a command transmitted to the handset (a handset conserve power command). The RAM 44 temporarily stores various data when the CPU 42 executes the control programs.

The RAM 44 includes a charging base unit power-saving mode flag 44a. The charging base unit power-saving mode flag 44a indicates whether the power mode of the charging base is a normal mode or a power-saving mode. The charging base unit power-saving mode flag 44a is initially set to OFF in an initialization step (see S31 of FIG. 5) executed when power is supplied to the charging base 40. The charging base unit power-saving mode flag 44a is subsequently set to ON or OFF based on subsequent steps. When the charging base unit power-saving mode flag 44a is set to OFF, the CPU 42 determines that the charging base 40 is in the normal mode. However, when the charging base unit power-saving mode flag 44a is set to ON, the CPU 42 determines that the charging base 40 is in the power-saving mode.

The CPU 42, ROM 43, and the RAM 44 are interconnected via the bus line 49. Accordingly, after power to the charging base 40 is switched on, the CPU 42 reads the control program from the ROM 43 and executes the program. Further, the CPU 42 temporarily stores various data in the RAM 44 while executing the control program and performs various control processes while reading this data from the RAM 44.

The charging base Bluetooth communication circuit 45 uses the 2.4 GHz frequency band according to the Bluetooth communication method for communicating wirelessly with a handset communication circuit 68 of the handset 60 described later at distances in a radius of about 10-100 meters. The data communicated between the charging base Bluetooth communication circuit 45 and the handset communication circuit 68 includes only commands and not voice signals. Power is continuously supplied to the charging base Bluetooth communication circuit 45, regardless of whether the charging base 40 is in the normal mode or the power-saving mode. Hence, the charging base Bluetooth communication circuit 45 can transmit and receive commands at all times. The charging base Bluetooth communication circuit 45 has a built-in antenna (not shown) for converting high-frequency current signals outputted from the charging base Bluetooth communication circuit 45 into radio waves.

The charging base Bluetooth communication circuit 45 is connected to the bus line 49 via a bus line. When the CPU 42 inputs a command into the charging base Bluetooth communication circuit 45 via the bus line 49, the charging base Bluetooth communication circuit 45 converts the inputted command into a high-frequency current signal that is emitted from the built-in antenna (not shown). Commands transmitted by the charging base Bluetooth communication circuit 45 include the handset start command and the handset conserve power command received by the charging base power line communication circuit 48.

On the other hand, the charging base Bluetooth communication circuit 45 extracts required commands from a high-frequency current signal received by the built-in antenna (not shown) and outputs these commands to the bus line 49 to be received by the CPU 42. The command received by the charging base Bluetooth communication circuit 45 is a base unit start command transmitted from the handset communication circuit 68.

The handset detection circuit 46 functions to detect the handset 60 when the handset 60 is mounted on the charging base 40. The handset detection circuit 46 is connected to the bus line 49 via a bus line. When the handset 60 is mounted on the charging base 40 and the handset detection circuit 46 detects the handset 60, the handset detection circuit 46 outputs a handset detection signal to the bus line 49 to be received by the CPU 42.

The charging base charging circuit 47 functions to charge the handset 60 when the handset 60 is mounted on the charging base 40. The charging base charging circuit 47 is connected to the bus line 49 via a bus line and is connected to the charging base power line communication circuit 48 by a power feed line (indicated by an arrow with a bold point). When the handset 60 is mounted on the charging base 40 and the handset detection circuit 46 outputs the handset detection signal to the bus line 49, the CPU 42 receives this outputted signal. Subsequently, the CPU 42 instructs the charging base charging circuit 47 to convert power supplied from the charging base power line communication circuit 48 into a direct current that is supplied to the handset 60.

The charging base power line communication circuit 48 is connected to the AC power cord 50 and is connected to the bus line 49 via a bus line. The charging base power line communication circuit 48 is also connected to the charging base charging circuit 47. The charging base power line communication circuit 48 performs power line communications by transferring and receiving commands via the AC power cord 50. Accordingly, data transmitted and received by the charging base power line communication circuit 48 via the AC power code 50 includes only commands and not voice signals. The AC power cord 50 is connected to the charging base power line communication circuit 48. The AC power code 50 is further connected to the AC outlet 82 configured of a commercial power outlet. The charging base power line communication circuit 48 receives a power supply from the AC power cord 50 at all times, regardless of whether the charging base 40 is in the normal mode or the power-saving mode. Therefore, the charging base power line communication circuit 48 can transmit and receive commands at all times. The charging base power line communication circuit 48 receives power supplied from the AC power cord 50 and supplies power to the charging base charging circuit 47. Here, in FIG. 1, the function to supply power to the charging base power line communication circuit 48 is indicated a line with an arrow at one end, and the function to transmit commands between the charging base power line communication circuit 48 and the AC outlet 82 is indicated by a line with arrows at both ends.

When the CPU 42 inputs a command to the charging base power line communication circuit 48 via the bus line 49, the charging base power line communication circuit 48 modulates the inputted command according to the power line carrier method and transmits the modulated command along the AC power cord 50. Commands transmitted from the charging base power line communication circuit 48 are outputted to the AC outlet 82 along the AC power cord 50 and conveyed to the AC outlet 81 through the commercial power line 83 and received by the base unit power line communication circuit 19 via the AC power code 26. The commands transmitted by the charging base power line communication circuit 48 include the base unit start command received by the charging base Bluetooth communication circuit 45, and the base unit conserve power command received by the charging base Bluetooth communication circuit 45 when the handset detection circuit 46 detects the handset 60. On the other hand, commands transmitted from the base unit power line communication circuit 19 are outputted to the AC outlet 81 along the AC power cord 26 and conveyed to the AC outlet 82 through the commercial power line 83 and received by the charging base power line communication circuit 48 via the AC power code 50.

On the other hand, when the charging base power line communication circuit 48 receives a command via the AC power cord 50, the charging base power line communication circuit 48 demodulates the command and outputs the demodulated command to the bus line 49 to be received by the CPU 42. Commands received by the charging base power line communication circuit 48 include the handset start command and the handset conserve power command.

The base unit power line communication circuit 19 in the base unit 10 and the charging base power line communication circuit 48 in the charging base 40 use the commercial power line 83 to communicate commands according to the power line carrier method. Unlike infrared data association (IrDA), a wireless optical communication protocol for exchanging data over infrared light, or IrSimple, a high-speed communication protocol using infrared light, communications using the commercial power line 83 does not require that the base unit power line communication circuit 19 and charging base power line communication circuit 48 be in close proximity to each other. Further, since the base unit power line communication circuit 19 and the charging base power line communication circuit 48 can exchange signals over the commercial power line 83, thereby using an existing infrastructure, a special communications circuit need not be provided between the base unit power line communication circuit 19 and the charging base power line communication circuit 48, as in the case of a wired LAN, thereby eliminating the need to invest in such an infrastructure. Further, the potential for interference is low when exchanging signals between the base unit power line communication circuit 19 and the charging base power line communication circuit 48 over the commercial power line 83, which is not the case when using the Bluetooth communication protocol. Hence, using the existing infrastructure, commands can be reliably exchanged between the base unit power line communication circuit 19 of the base unit 10 and the charging base power line communication circuit 48 of the charging base 40.

Lastly, the handset 60 will be described. The handset 60 functions to communicate wirelessly with the base unit 10 according to the frequency-hopping spread spectrum technique and to communicate wirelessly with the charging base 40 according to the Bluetooth protocol. As shown in FIG. 1, the handset 60 includes a handset controller 61, a panel gate array (panel GA) 72, operating keys 73, a handset wireless communication device 65, a handset charging circuit 70, a rechargeable battery 71, a handset communication circuit 68, and a charging base detection circuit 69.

The handset controller 61 functions to control the handset wireless communication device 65, the handset communication circuit 68, the charging base detection circuit 69, and the handset charging circuit 70 via a bus line 74 and to receive signals outputted from the panel GA 72. The handset controller 61 primarily includes a CPU 62, a ROM 63, and a RAM 64.

The CPU 62 is an arithmetic unit for controlling each component of the handset 60. The ROM 63 is a non-writable, nonvolatile memory for storing control programs executed by the CPU 62 (an example of which is illustrated by flowcharts in FIGS. 8 through 10) and a command transmitted to the base unit 10 (a base unit start command). The RAM 64 temporarily stores various data when the CPU 62 executes the control programs.

The RAM 64 includes a handset power-saving mode flag 64a. The handset power-saving mode flag 64a indicates whether the power mode of the handset 60 is a normal mode for supplying power to the handset data wireless communication circuit 66 of the handset 60 or a power-saving mode for interrupting the supply of power to the handset data wireless communication circuit 66. The handset power-saving mode flag 64a is initially set to OFF in an initialization step (see S61 of FIG. 8) executed when power is supplied to the handset 60.

The handset power-saving mode flag 64a is subsequently set to ON or OFF based on subsequent steps. When the handset power-saving mode flag 64a is set to OFF, the CPU 62 determines that the handset 60 is in the normal mode. However, when the handset power-saving mode flag 64a is set to ON, the CPU 62 determines that the handset 60 is in the power-saving mode.

The CPU 62, the ROM 63, and the RAM 64 are interconnected via the bus line 74. Accordingly, after power to the handset 60 is switched on, the CPU 62 reads the control program from the ROM 63 and executes the program. Further, the CPU 62 temporarily stores various data in the RAM 64 while executing the control program and performs various control processes while reading this data from the RAM 64.

The panel GA 72 functions to detect desired commands inputted with the operating keys 73. The panel GA 72 is connected to the operating keys 73 through a bus line and is also connected to the bus line 74. When a user operates the operating keys 73, the panel GA 72 detects the operated keys and outputs detection signals to the bus line 74 based on the operated keys. The CPU 62 receives detection signals outputted by the panel GA 72.

The handset wireless communication device 65 functions to communicate wirelessly with the base unit 10 according to the frequency-hopping spread spectrum technique.

The handset wireless communication device 65 includes a handset data wireless communication circuit 66, a handset power switching circuit 67, and an antenna 75. The handset data wireless communication circuit 66 is integrally configured of a transmission device (not shown) for converting data to be transmitted into a high-frequency current signal and for transmitting this signal to the antenna 75, and a reception device (not shown) for extracting required data from a high-frequency current signal received by the antenna 75. The handset data wireless communication circuit 66 is also provided with an oscillator circuit for outputting an oscillating signal, an amplifier circuit for amplifying the signal.

The handset data wireless communication circuit 66 is connected to the antenna 75. The handset data wireless communication circuit 66 also connected to the bus line 74 through a bus line. The handset data wireless communication circuit 66 is also connected to the handset power switching circuit 67 by a power feed line (indicated by an arrow with a bold point). When the CPU 62 inputs a signal (a voice signal or command, for example) to the handset data wireless communication circuit 66 via the bus line 74, the handset data wireless communication circuit 66 converts this signal into a high-frequency current signal, which is emitted from the antenna 75. On the other hand, when a high-frequency current signal is received by the antenna 75, the handset data wireless communication circuit 66 extracts the necessary voice signal, command, or the like from the inputted current signal and outputs this extracted signal to the bus line 74 to be received by the CPU 62. The handset data wireless communication circuit 66 is powered by electricity supplied from the handset power switching circuit 67. Hence, if the power supply from the handset power switching circuit 67 is interrupted and the handset 60 shifts from the normal mode into the power-saving mode, the handset data wireless communication circuit 66 is incapable of performing wireless communications.

The handset power switching circuit 67 functions to switch the power supply to the handset data wireless communication circuit 66 on and off. The handset power switching circuit 67 is connected to the handset data wireless communication circuit 66 by a power line (indicated by an arrow with bold point). The handset power switching circuit 67 is also connected to the rechargeable battery 71 by power feed lines (indicated by arrow with bold point). The handset power switching circuit 67 is also connected to the bus line 74 via a bus line. When the CPU 62 inputs a command to the handset power switching circuit 67 via the bus line 74 for interrupting the power supply, the handset power switching circuit 67 interrupts the power supplied from the rechargeable battery 71 to the handset data wireless communication circuit 66, shifting the handset 60 from the normal mode to the power-saving mode. That is, based on this command, the handset power switching circuit 67 interrupts the supply of power from the rechargeable battery 71 to the handset data wireless communication circuit 66, shifting the handset 60 from the normal mode to the power-saving mode when the handset communication circuit 68 receives the handset conserve power command instructing the handset 60 to shift from the normal mode to the power-saving mode.

On the other hand, when the CPU 62 inputs a command to the handset power switching circuit 67 via the bus line 74 to supply power, the handset power switching circuit 67 supplies power from the rechargeable battery 71 to the handset data wireless communication circuit 66, shifting the handset 60 from the power-saving mode to the normal mode. That is, the handset power switching circuit 67 supplies power from the rechargeable battery 71 to the handset data wireless communication circuit 66 when key input is received via the operating keys 73 or when the handset communication circuit 68 receives a handset start command instructing the handset 60 to shift from the power-saving mode to the normal mode.

The rechargeable battery 71 functions to supply power to the handset data wireless communication circuit 66. The rechargeable battery 71 is connected to the handset power switching circuit 67 by a power feed line (indicated by an arrow with bold point). The rechargeable battery 71 is connected to the handset charging circuit 70 by a power feed line (indicated by an arrow with bold point). The rechargeable battery 71 accumulates power supplied from the handset charging circuit 70 and sets the power to a prescribed amount before supplying power to the handset power switching circuit 67.

The charging base detection circuit 69 detects the charging base 40 when the handset 60 is mounted on the charging base 40. The charging base detection circuit 69 is connected to the bus line 74 via a bus line. When the handset 60 is mounted on the charging base 40 and the charging base detection circuit 69 detects the charging base 40, the charging base detection circuit 69 outputs a charging base detection signal to the bus line 74, which signal is received by the CPU 62.

The handset charging circuit 70 functions to receive power supplied from the charging base charging circuit 47 when the handset 60 is mounted on the charging base 40. When the handset 60 is mounted on the charging base 40, the handset charging circuit 70 is electrically connected to the charging base charging circuit 47. The handset charging circuit 70 is connected to the bus line 74 via a bus line and is connected to the rechargeable battery 71. When the handset 60 is mounted on the charging base 40 and the charging base detection circuit 69 outputs a charging base detection signal to the bus line 74, the CPU 62 receives this charging base detection signal. Upon receiving a command from the CPU 62, the handset charging circuit 70 begins accepting power from the charging base charging circuit 47 and supplying the power to the rechargeable battery 71.

The handset communication circuit 68 uses the 2.4 GHz frequency band according to the Bluetooth communication method for communicating wirelessly with the charging base Bluetooth communication circuit 45 of the charging base 40 described later at distances in a radius of about 10-100 meters. The data communicated between the handset communication circuit 68 and the Bluetooth communication circuit 45 includes only commands and not voice signals. Power is continuously supplied to the handset communication circuit 68, regardless of whether the handset 60 is in the normal mode or the power-saving mode. Hence, the handset communication circuit 68 can transmit and receive commands at all times. The handset communication circuit 68 has a built-in antenna (not shown) for converting high-frequency current signals outputted from the handset communication circuit 68 into radio waves.

The handset communication circuit 68 is connected to the bus line 74 via a bus line. When the CPU 62 inputs a command to the handset communication circuit 68 via the bus line 74, the handset communication circuit 68 converts the inputted command to a high-frequency current signal that is emitted from the built-in antenna (not shown). The command transmitted by the handset communication circuit 68 at this time is a base unit start command instructing the base unit 60 to shift from the power-saving mode to the normal mode.

On the other hand, when a high-frequency current signal received by the built-in antenna (not shown) is inputted into the handset communication circuit 68, the handset communication circuit 68 extracts required commands from the signal and outputs these commands to the bus line 74 to be received by the CPU 62. Commands received by the handset communication circuit 68 at this time include the handset start command and the handset conserve power command transmitted from the charging base Bluetooth communication circuit 45.

Since the handset communication circuit 68 and charging base Bluetooth communication circuit 45 communicate wirelessly, the charging base 40 and handset 60 can exchange commands regardless of whether or not the handset 60 is mounted on the charging base 40.

With the cordless communication system 1 having the construction described above, the base unit wireless communication device 15 and the handset wireless communication device 65 exchange voice signals, and commands wirelessly according to the frequency-hopping spread spectrum technique when the base unit 10 and the handset 60 are set to the normal mode. However, when the base unit 10 and handset 60 are in the power-saving mode, the power supply to the base unit wireless communication device 15 and the handset wireless communication device 65 is shut off, preventing wireless communication. Hence, when the base unit 10 and handset 60 are in the power-saving mode, commands are exchanged between the base unit power line communication circuit 19 and the handset communication circuit 68 via the AC outlet 81, the commercial power line 83, the AC outlet 82, and the charging base 40.

FIG. 2 is a flowchart illustrating steps in a main process executed by the base unit controller 11 of the base unit 10. The main process is executed when the power to the base unit 10 is turned on and functions to select one of a base unit normal mode process when the base unit 10 is in the normal mode and a base unit power-saving mode process when the base unit 10 is in the power-saving mode.

In S1 at the beginning of the main process, the base unit controller 11 initializes the base unit 10. Specifically, the base unit controller 11 initializes each component of the base unit 10 and sets the base unit power-saving mode flag 14a to OFF, indicating the normal mode. In S2 the base unit controller 11 determines whether the base unit power-saving mode flag 14a is off. If the base unit power-saving mode flag 14a is off (S2: YES), then in S3 the base unit controller 11 executes the base unit normal mode is process. However, if the base unit power-saving mode flag 14a is on (S2: NO), then in S4 the base unit controller 11 executes the base unit power-saving mode process.

After executing one of the processes in S3 and S4, the base unit controller 11 returns to S2 and determines again whether the base unit power-saving mode flag 14a is off. In this way, the main process functions to select either the base unit normal mode process of S3 or the base unit power-saving mode process of S4 based on the setting of the base unit power-saving mode flag 14a and to execute the selected process.

FIG. 3 is a flowchart illustrating steps in the base unit normal mode process of S3 executed by the base unit controller 11 of the base unit 10. The base unit normal mode process is executed when the base unit controller 11 determines in the main process that the base unit power-saving mode flag 14a is off and, thus, the base unit 10 is in the normal mode.

In S11 at the beginning of the base unit normal mode process, the base unit controller 11 determines whether five minutes has elapsed since the telephone line became open and since the last key input. The CPU 12 begins timing when the communication control circuit 22 detects that the telephone line became open or when the panel GA 20 detects key input. If five minutes has elapsed since the CPU 12 began timing, indicating that five minutes has elapsed since the telephone circuit became open or since the last key input (S11: YES), that is, if five minutes has elapsed since later one of a time when the telephone line has been opened and a time when the last key has been inputted via the operating key 21, then in S12 the base unit controller 11 transmits a handset conserve power command from the base unit power line communication circuit 19 to the charging base 40 for shifting the handset 60 from the normal mode to the power-saving mode.

In S13 the base unit controller 11 issues a command to the base unit power switching circuit 17 for cutting the supply of power from the base unit power supply circuit 18 to the base unit data wireless communication circuit 16 in order to shift the base unit 10 from the normal mode to the power-saving mode. That is, this command instructs the base unit power switching circuit 17 to interrupt power supply to the base unit data wireless communication circuit 16 from the base unit power supply circuit 18. This process effectively cuts off the supply of power to the base unit data wireless communication circuit 16, rendering the base unit data wireless communication circuit 16 incapable of wireless communications. Hence, the supply of power to the base unit data wireless communication circuit 16 can be interrupted by shifting the base unit 10 into the power-saving mode, thereby reducing power consumption in the base unit 10 when the base unit 10 is in the power-saving mode.

In S14 the base unit controller 11 sets the base unit power-saving mode flag 14a for the base unit 10 to ON, indicating that the base unit 10 has shifted into the power-saving mode, and subsequently ends the base unit normal mode process of S3.

However, if the base unit controller 11 determines in S11 that five minutes has not elapsed since the telephone circuit became open or since the last key input (S11: NO), then in S15 the base unit controller 11 determines whether the base unit power line communication circuit 19 has received a base unit conserve power command is for shifting the base unit 10 from the normal mode to the power-saving mode.

If the base unit controller 11 determines that the base unit power line communication circuit 19 has received the base unit conserve power command (S15: YES), then the base unit controller 11 advances to S13 to issue a command to the base unit power switching circuit 17 for interrupting the power supply from the base unit power supply circuit 18 to the base unit data wireless communication circuit 16. That is, this command instructs the base unit power switching circuit 17 to interrupt the power supply from the base unit power supply circuit 18 to the base unit data wireless communication circuit 16. In S14 the base unit controller 11 sets the base unit power-saving mode flag 14a of the base unit 10 to ON, indicating the base unit 10 has been shifted into the power-saving mode, and subsequently ends the base unit normal mode process of S3.

However, if the base unit power line communication circuit 19 has not received the base unit conserve power command (S15: NO), then the base unit controller 11 simply ends the base unit normal mode process of S3.

Through the normal mode process of S3, the base unit controller 11 transmits a handset conserve power command from the base unit power line communication circuit 19 to the handset 60 for shifting the handset 60 from the normal mode to the power-saving mode and controls the base unit power switching circuit 17 to interrupt the power supply to the base unit data wireless communication circuit 16 from the base unit power supply circuit 18 when five minutes has elapsed since either the telephone circuit became open and since the last key input. Hence, the power supply to the base unit data wireless communication circuit 16 can be interrupted by shifting the base unit 10 into the power-saving mode, thereby reducing power consumption in the base unit 10 when the base unit 10 is in the power-saving mode.

FIG. 4 is a flowchart illustrating steps in the base unit power-saving mode process of S4 executed by the base unit controller 11 of the base unit 10. This process is executed when the base unit controller 11 determines in the main process that the base unit 10 is in the power-saving mode based on the base unit power-saving mode flag 14a being on.

In S21 at the beginning of the base unit power-saving mode process of S4, the base unit controller 11 determines whether an incoming call has been received on the telephone line 23 or whether key input has been received. Specifically, if the communication control circuit 22 detects an incoming call on the telephone line 23 or the panel GA 20 detects key input (S21: YES), then in S22 the base unit controller 11 transmits the handset start command from the base unit power line communication circuit 19 to the charging base 40 via the AC outlet 81, the commercial power line 83, and the AC outlet 82 for shifting the handset 60 from the power-saving mode to the normal mode.

In S23 the base unit controller 11 issues a command to the base unit power switching circuit 17 to supply power from the base unit power supply circuit 18 to the base unit data wireless communication circuit 16 for shifting the base unit 10 from the power-saving mode to the normal mode. That is, this command instructs the base unit power switching circuit 17 to supply power from the base unit power supply circuit 18 to the base unit data wireless communication circuit 16. Through the process of S23, power is supplied to the base unit data wireless communication circuit 16. In S24 the base unit controller 11 initializes the base unit data wireless communication circuit 16 so that the base unit data wireless communication circuit 16 can perform wireless communications.

In S25 the base unit controller 11 sets the base unit power-saving mode flag 14a of the base unit 10 to OFF, indicating that the base unit 10 has been shifted into the normal mode, and subsequently ends the base unit power-saving mode process of S4.

However, if the base unit controller 11 determines in S21 that neither incoming call nor key input has been received (S21: NO), then in S26 the base unit controller 11 determines whether the base unit power line communication circuit 19 has received a base unit start command for shifting the base unit 10 from the power-saving mode to the normal mode.

If the base unit power line communication circuit 19 has received the base unit start command from the charging base 40 via the AC power code 26, the AC outlet 81, the commercial power line 83, the AC outlet 82, and the AC power code 50 (S26: YES), then the base unit controller 11 advances to S23 and issues a command to the base unit power switching circuit 17 for supplying power from the base unit power supply circuit 18 to the base unit data wireless communication circuit 16. That is, this command instructs the base unit power switching circuit 17 to supply power from the base unit power supply circuit 18 to the base unit data wireless communication circuit 16 in order to shift the base unit 10 from the power-saving mode to the normal mode. In S24 the base unit controller 11 initializes the base unit data wireless communication circuit 16 to enable wireless communications therewith. In S25 the base unit controller 11 sets the base unit power-saving mode flag 14a to OFF, indicating that the base unit 10 has been shifted into the normal mode. Subsequently, the base unit controller 11 ends the base unit power-saving mode process of S4.

Further, if the base unit controller 11 determines in S26 that the base unit power line communication circuit 19 has not received the base unit start command (S26: NO), then the base unit controller 11 simply ends the base unit power-saving mode process of S4.

Through the process of S4, the base unit controller 11 can shift the base unit 10 from the power-saving mode to the normal mode, when the base unit 10 has been shifted to the power-saving mode and the power supply to the base unit data wireless communication circuit 16 has been interrupted, if the communication control circuit 22 detects an incoming call via the telephone line 23 or the panel GA 20 detects key input, or if the base unit power line communication circuit 19 receives a base unit start command. Hence, even when the power supply to the base unit data wireless communication circuit 16 is cut off to reduce power consumption in the base unit 10, that is, the base unit 10 is in the power-saving mode, the base unit controller 11 can reliably shift the base unit 10 from the power-saving mode to the normal mode and restart power supply to the base unit data wireless communication circuit 16 to enable wireless communications with the handset 60.

Figure 5:
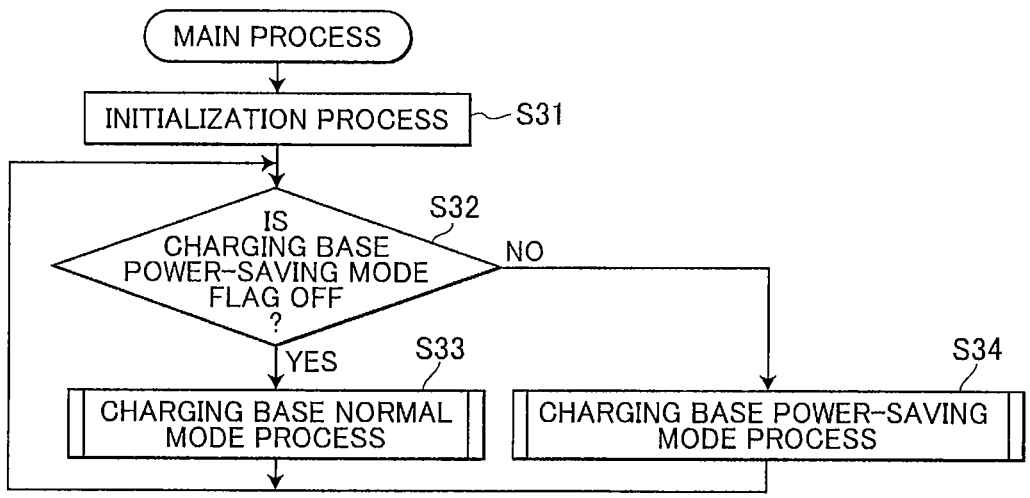
FIG. 5 is a flowchart illustrating steps in a main process executed by a charging base controller of the charging base.

FIG. 5 is a flowchart illustrating steps in a main process executed by the charging base controller 41 of the charging base 40. The main process is executed when the power to the charging base 40 is turned on. The main process serves to select either a charging base normal mode process when the charging base 40 is in the normal mode or a charging base power-saving mode process when the charging base 40 is in the power-saving mode.

In S31 at the beginning of the main process, the charging base controller 41 initializes the charging base 40. Specifically, the charging base controller 41 initializes each component in the charging base 40 and sets the charging base unit power-saving mode flag 44a to OFF, indicating the charging base 40 is in the normal mode. In S32 the charging base controller 41 determines whether the charging base unit power-saving mode flag 44a is off. If the charging base unit power-saving mode flag 44a is off (S32: YES), then in S33 the charging base controller 41 executes the charging base normal mode process. However, if the charging base unit power-saving mode flag 44a is on (S32: NO), then in S34 the charging base controller 41 executes the charging base power-saving mode process.

After executing either the charging base normal mode process of S33 or the charging base power-saving mode process of S34, the charging base controller 41 returns to S32 to determine again whether the charging base unit power-saving mode flag 44a is off. Hence, in the main process the charging base controller 41 selects either the charging base normal mode process of S33 or the charging base power-saving mode process of S34 and executes the selected process.

Figure 6:
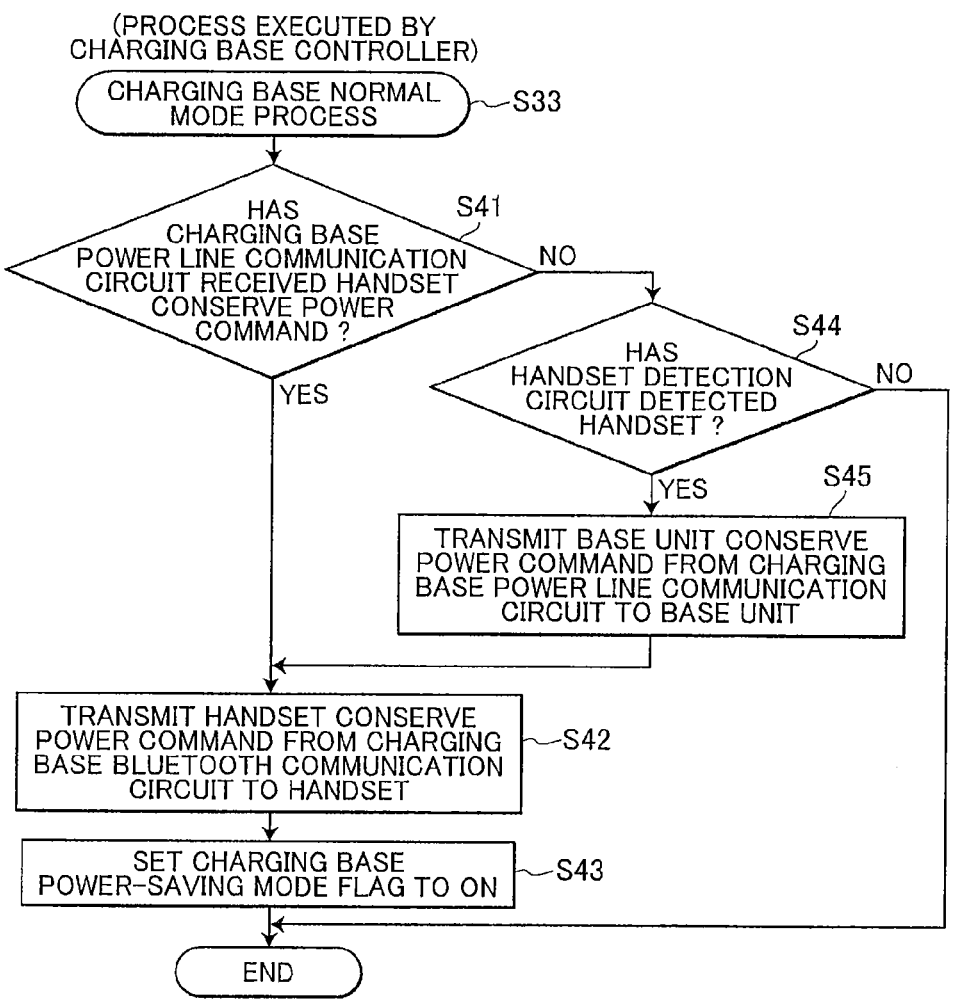
FIG. 6 is a flowchart illustrating steps in a charging base normal mode process executed by the charging base controller.

FIG. 6 is a flowchart illustrating steps in the charging base normal mode process of S33 executed by the charging base controller 41. This process is executed when the charging base controller 41 determines in the main process that the charging base 40 is in the normal mode based on the charging base unit power-saving mode flag 44a being set to on.

In S41 of the charging base normal mode process of S33, the charging base controller 41 determines whether the charging base power line communication circuit 48 has received the handset conserve power command that is transmitted from the base unit power line communication circuit 19. If the charging base power line communication circuit 48 has received this command (S41: YES), then in S42 the charging base controller 41 transmits the handset conserve power command from the charging base Bluetooth communication circuit 45 to the handset 60 shifting the handset 60 into the power-saving mode.

In S43 the charging base controller 41 sets the charging base unit power-saving mode flag 44a of the charging base 40 to ON, indicating that the charging base 40 has been shifted into the power-saving mode, and subsequently ends the charging base normal mode process of S33.

However, if the charging base controller 41 determines in S41 that the charging base power line communication circuit 48 has not received the handset conserve power command (S41: NO), then in S44 the charging base controller 41 determines whether the handset detection circuit 46 has detected the handset 60.

If the handset detection circuit 46 has detected the handset 60 (S44: YES), then in S45 the charging base controller 41 transmits the base unit conserve power command from the charging base power line communication circuit 48 to the base unit 10 in order to shift the base unit 10 from the normal mode to the power-saving mode. At this time, the charging base charging circuit 47 begins supplying power to the handset charging circuit 70 in the handset 60 for charging the handset 60. Subsequently, the charging base controller 41 advances to S42 and transmits the handset conserve power command from the charging base Bluetooth communication circuit 45 to the handset 60 in order to shift the handset 60 from the normal mode to the power-saving mode.

In S43 the charging base controller 41 sets the charging base unit power-saving mode flag 44a to ON, indicating that the charging base 40 has been shifted into the power-saving mode, and subsequently ends the charging base normal mode process of S33.

However, if the charging base controller 41 determines in S44 that the handset detection circuit 46 has not detected the handset 60 (S44: NO), then the charging base controller 41 simply ends the charging base normal mode process of S33.

Hence, if the handset detection circuit 46 detects the handset 60 in the charging base normal mode process of S33, the charging base charging circuit 47 begins supplying power to the handset charging circuit 70 in the handset 60 for charging the handset 60. Furthermore, the charging base power line communication circuit 48 transmits the base unit conserve power command, while the charging base Bluetooth communication circuit 45 transmits the handset conserve power command. Hence, when the handset detection circuit 46 detects the handset 60, i.e., when the handset 60 is placed on the charging base 40, both the base unit 10 and handset 60 are shifted from the normal mode to the power-saving mode. Therefore, the base unit power switching circuit 17 of the base unit 10 interrupts the supply of power to the base unit data wireless communication circuit 16, while the handset power switching circuit 67 of the handset 60 interrupts the supply of power to the handset data wireless communication circuit 66, thereby reducing power consumption in the base unit 10 and the handset 60, while the base unit 10 and handset 60 are in the power-saving mode.

Figure 7:
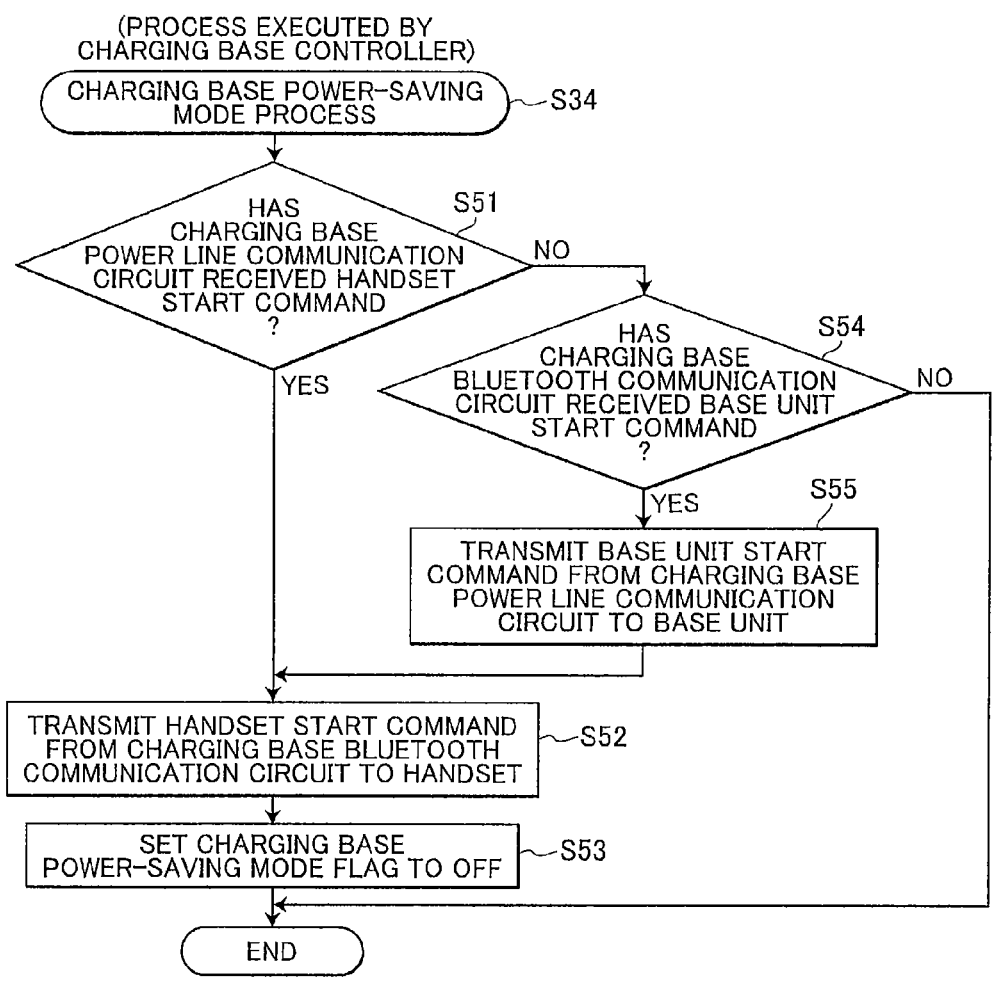
FIG. 7 is a flowchart illustrating steps in a charging base power-saving mode process executed by the charging base controller.

FIG. 7 is a flowchart illustrating steps in the charging base power-saving mode process of S34 executed by the charging base controller 41. This process is executed when the charging base controller 41 determines in the main process that the charging base 40 is in the power-saving mode based on the charging base unit power-saving mode flag 44a being set to on.

In S51 at the beginning of the charging base power-saving mode process of S34, the charging base controller 41 determines whether the charging base power line communication circuit 48 has received the handset start command. If the charging base power line communication circuit 48 has received the handset start command (S51: YES), then in S52 the charging base controller 41 transmits the handset start command from the charging base Bluetooth communication circuit 45 to the handset 60 in order to shift the handset 60 into the normal mode.

In S53 the charging base controller 41 sets the charging base unit power-saving mode flag 44a of the charging base 40 to OFF, indicating that the charging base 40 has been shifted into the normal mode, and subsequently ends the charging base power-saving mode process of S34.

However, if the charging base controller 41 determines in S51 that the charging base power line communication circuit 48 has not received the handset start command (S51: NO), then in S54 the charging base controller 41 determines whether the charging base Bluetooth communication circuit 45 has received the base unit start command.

If the charging base Bluetooth communication circuit 45 has received the base unit start command (S54: YES), then in S55 the charging base controller 41 transmits the base unit start command from the charging base power line communication circuit 48 to the base unit 10 through the commercial power line 83 in order to shift the base unit 10 from the power-saving mode to the normal mode.

Subsequently in S53 the charging base controller 41 sets the charging base unit power-saving mode flag 44a to OFF, indicating that the charging base 40 has been shifted to the normal mode, and then ends the charging base power-saving mode process of S34.

However, if the charging base controller 41 determines in S54 that the charging base Bluetooth communication circuit 45 has not received the base unit start command (S54: NO), then the charging base controller 41 simply ends the charging base power-saving mode process of S34.

Hence, in the charging base power-saving mode process of S34, the charging base power line communication circuit 48 and charging base Bluetooth communication circuit 45 of the charging base 40 function to relay commands between the base unit 10 and handset 60 so that the communication of such commands is not impeded, despite the charging base 40 being interposed between the base unit 10 and handset 60. Accordingly, commands transmitted by the base unit power line communication circuit 19 of the base unit 10 are received by the handset communication circuit 68 of the handset 60, reliably switching the mode of the handset 60, while commands transmitted by the handset communication circuit 68 of the handset 60 are received by the base unit power line communication circuit 19 of the base unit 10, reliably switching the mode of the base unit 10.

Figure 8:
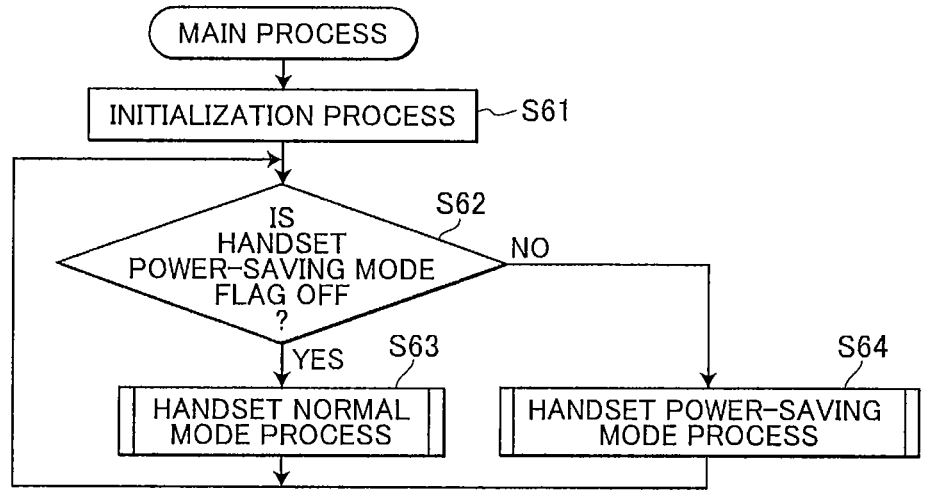
FIG. 8 is a flowchart illustrating steps in a main process executed by a handset controller of a handset.

FIG. 8 is a flowchart illustrating steps in a main process executed by the handset controller 61 of the handset 60. The main process is executed when the power to the handset 60 is turned on. The main process serves to select either a handset normal mode process when the handset 60 is in the normal mode or a handset power-saving mode process when the handset 60 is in the power-saving mode.

In S61 at the beginning of the main process, the handset controller 61 initializes the handset 60. Specifically, the handset controller 61 initializes each component of the handset 60 and sets the handset power-saving mode flag 64a to OFF, indicating the normal mode. In S62 the handset controller 61 determines whether the handset power-saving mode flag 64a is off. If the handset power-saving mode flag 64a is off (S62: YES), then in S63 the handset controller 61 executes the handset normal mode process. However, if the handset power-saving mode flag 64a is on (S62: NO), then in S64 the handset controller 61 executes the handset power-saving mode process.

After executing either the handset normal mode process of S63 or the handset power-saving mode process of S64, the handset controller 61 returns to S62 to determine again whether the handset power-saving mode flag 64a is off. In this way, in the main process the handset controller 61 selects either the handset normal mode process of S63 or the handset power-saving mode process of S64 based on the setting of the handset power-saving mode flag 64a and executes the selected process.

Figure 9:
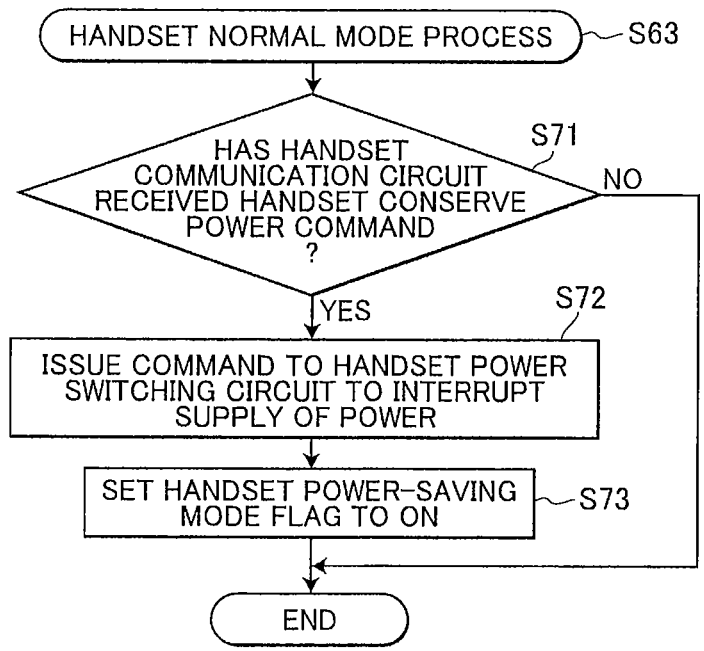
FIG. 9 is a flowchart illustrating steps in a handset normal mode process executed by the handset controller of the handset.

FIG. 9 is a flowchart illustrating steps in the handset normal mode process of S63 executed by the handset controller 61 of the handset 60. This process is executed when the handset controller 61 determines in the main process that the handset 60 is in the normal mode based on the setting of the handset power-saving mode flag 64a being off.

In S71 at the start of the handset normal mode process of S63, the handset controller 61 determines whether the handset communication circuit 68 has received the handset conserve power command. If the handset communication circuit 68 has received the handset conserve power command (S71: YES), then in S72 the handset controller 61 issues a command to the handset power switching circuit 67 for interrupting the supply of power from the rechargeable battery 71 to the handset data wireless communication circuit 66 in order to shift the handset 60 from the normal mode to the power-saving mode. That is, this command instructs the handset power switching circuit 67 to interrupt the supply of power from the rechargeable battery 71 to the handset data wireless communication circuit 66.

In S73 the handset controller 61 sets the handset power-saving mode flag 64a of the handset 60 to ON, indicating that the handset 60 has been shifted to the power-saving mode, and subsequently ends the handset normal mode process of S63.

However, if the handset controller 61 determines in S61 that the handset communication circuit 68 has not received the handset conserve power command (S71: NO), then the handset controller 61 ends the handset normal mode process of S63 in order to keep the handset 60 in the normal mode.

Through the normal mode process of S63, the handset power switching circuit 67 interrupts the supply of power from the rechargeable battery 71 to the handset data wireless communication circuit 66 when the handset communication circuit 68 receives the handset conserve power command.

Accordingly, the power supply to the handset data wireless communication circuit 66 can be shut off by shifting the handset 60 to the power-saving mode, thereby reducing power consumption in the handset 60 when the handset 60 is in the power-saving mode.

Figure 10:
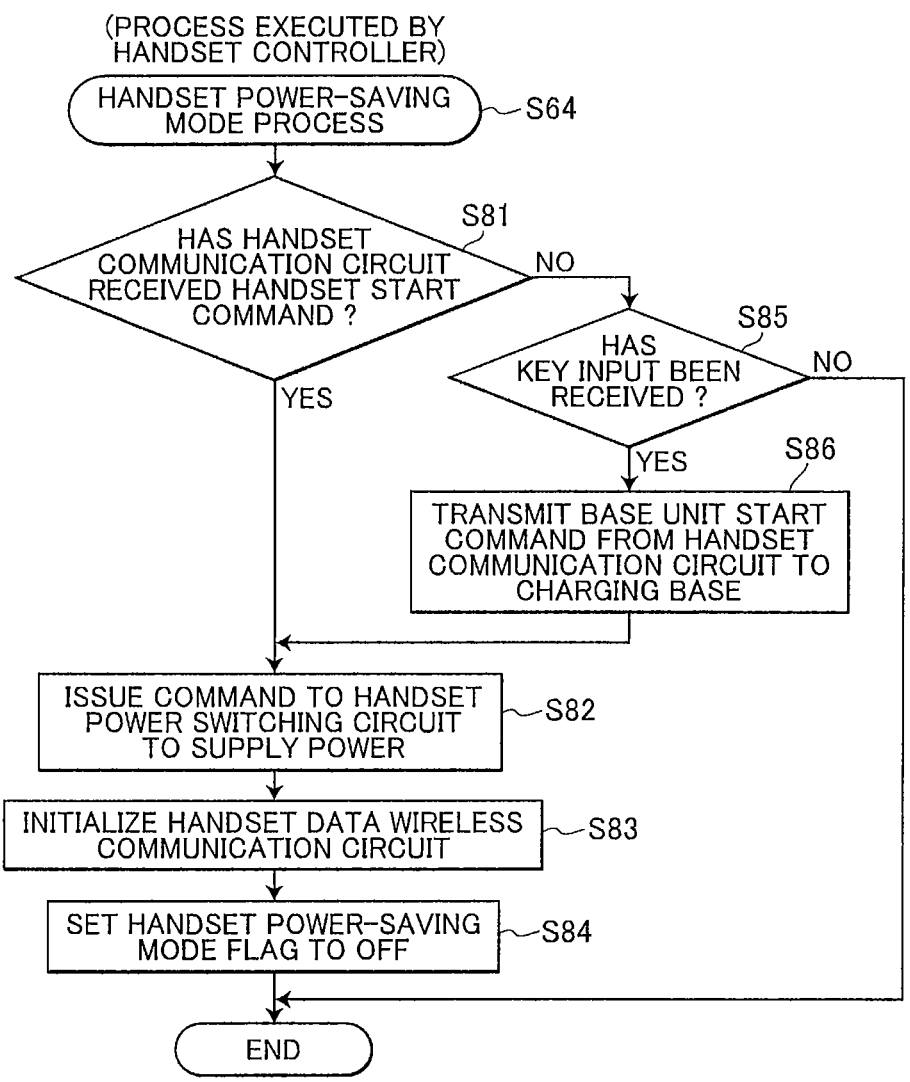
FIG. 10 is a flowchart illustrating steps in a handset power-saving mode process executing by the handset controller.

FIG. 10 is a flowchart illustrating steps in the handset power-saving mode process of S64 executed by the handset controller 61. This process is executed when the handset controller 61 determines in the main process that the handset 60 is in the power-saving mode based on the setting of the handset power-saving mode flag 64*a* being ON.

In S81 at the beginning of the handset power-saving mode process of S64, the handset controller 61 determines whether the handset communication circuit 68 has received the handset start command. If the handset communication circuit 68 has received the handset start command (S81: YES), then in S82 the handset controller 61 issues a command to the handset power switching circuit 67 to supply power from the rechargeable battery 71 to the handset data wireless communication circuit 66 in order to shift the handset 60 from the power-saving mode to the normal mode. That is, this command instructs the handset power switching circuit 67 to supply power from the rechargeable battery 71 to the handset data wireless communication circuit 66. Hence, power is supplied to the handset data wireless communication circuit 66 by the process in S82. In S83 the handset controller 61 initializes the handset data wireless communication circuit 66 to enable wireless communications therewith.

In S84 the handset controller 61 sets the handset power-saving mode flag 64*a* to OFF, indicating that the handset 60 has been shifted to the normal mode. Subsequently, the handset controller 61 ends the handset power-saving mode process of S64.

However, if the handset controller 61 determines in S81 that the handset communication circuit 68 did not receive the handset start command (S81: NO), then in S85 the handset controller 61 determines whether key input has been received by the panel GA 72. If key input has been received (S85: YES), then in S86 the handset controller 61 transmits the base unit start command from the handset communication circuit 68 to the charging base 40 in order to shift the base unit 10 from the power-saving mode to the normal mode.

Subsequently, the handset controller 61 executes the processes from S82 to S84 to shift the handset 60 from the power-saving mode to the normal mode and ends the handset power-saving mode process of S64.

However, if the handset controller 61 determines in S85 that there is no key input (S85: NO), then the handset controller 61 simply ends the handset power-saving mode process of S64.

Through the handset power-saving mode process of S64, the handset 60 can be shifted from the power-saving mode to the normal mode, even though the power supply to the handset data wireless communication circuit 66 has been interrupted because the handset 60 was shifted to the power-saving mode, if the handset communication circuit 68 receives the handset start command or the panel GA 72 detects key input. Hence, even though power to the handset data wireless communication circuit 66 is interrupted to reduce power consumption in the handset 60 during the power-saving mode, the handset 60 can be reliably shifted from the power-saving mode to the normal mode, thereby resuming power supply to the handset data wireless communication circuit 66 to enable wireless communications with the base unit 10.

In the embodiment described above, the base unit power line communication circuit 19 transmits the handset conserve power command to the handset 60 through the commercial power line 83 for shifting the handset 60 from the normal mode to the power-saving mode and the base unit power switching circuit 17 interrupts the supply of power to the base unit data wireless communication circuit 16 if five minutes has elapsed since the telephone line became open or since the last key input, that is, if five minutes has elapsed since later one of a time when the telephone line has been opened and a time when the last key has been inputted via the operating key 21. Therefore, the supply of power to the base unit data wireless communication circuit 16 can be cut off by shifting the base unit 10 into the power-saving mode, thereby reducing the power consumption in the base unit 10 when the base unit 10 is in the power-saving mode.

Further, according to the embodiment, the handset power switching circuit 67 can interrupt the supply of power from the rechargeable battery 71 to the handset data wireless communication circuit 66 when the handset communication circuit 68 receives the handset conserve power command. Therefore, the supply of power to the handset data wireless communication circuit 66 can be interrupted by shifting the handset 60 into the power-saving mode, thereby reducing power consumption in the handset 60 when the handset 60 is in the power-saving mode.

Further, according to the embodiment, the base unit 10 can be shifted from the power-saving mode to the normal mode, even when the base unit 10 has been shifted to the power-saving mode in order to interrupt the power supply to the base unit data wireless communication circuit 16, if the communication control circuit 22 detects an incoming call on the telephone line 23 or the communication control circuit 22 detects key input, or if the base unit power line communication circuit 19 receives a base unit start command. Therefore, even if the supply of power to the base unit data wireless communication circuit 16 is cut off to reduce power consumption in the base unit 10 when the base unit 10 is in the power-saving mode, the base unit 10 can be reliably shifted back to the normal mode, thereby resuming the supply of power to the base unit data wireless communication circuit 16 to enable wireless communications with the handset 60.

Further, according to the embodiment, the handset 60 can be shifted from the power-saving mode to the normal mode, even if the handset 60 has been shifted to the power-saving mode to cut off the supply of power to the handset data wireless communication circuit 66, if the handset communication circuit 68 receives the handset start command or the panel GA 72 detects key input. Hence, even if the power supply to the handset data wireless communication circuit 66 has been interrupted to reduce power consumption in the handset 60 when the handset 60 is in the power-saving mode, the handset 60 can be shifted back to the normal mode, thereby resuming power supply to the handset data wireless communication circuit 66 to enable wireless communications with the base unit 10.

Second Embodiment

Figure 11:
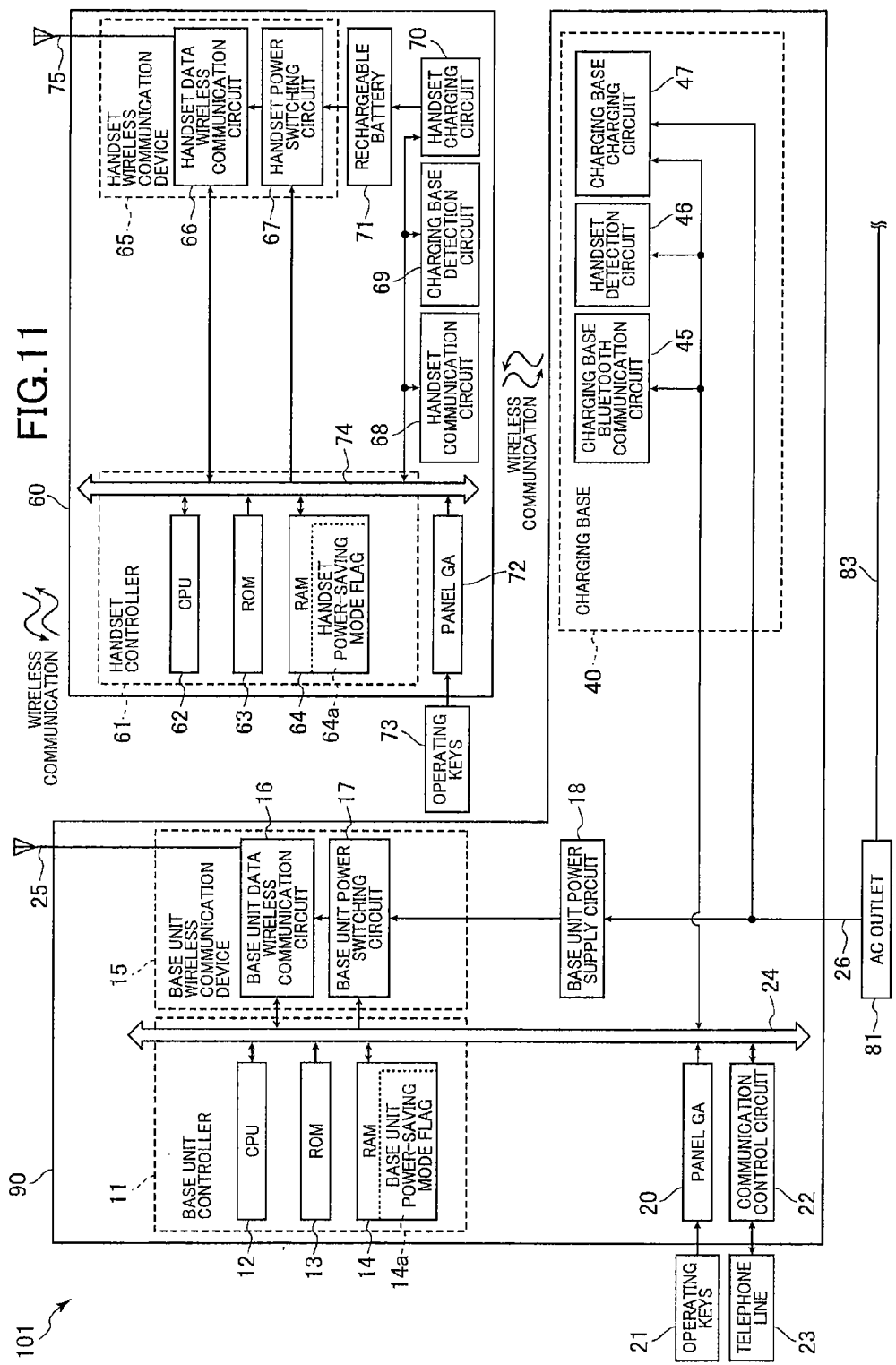
FIG. 11 is a block diagram showing an electrical structure of a cordless communication system according to a second embodiment.
Figure 12:
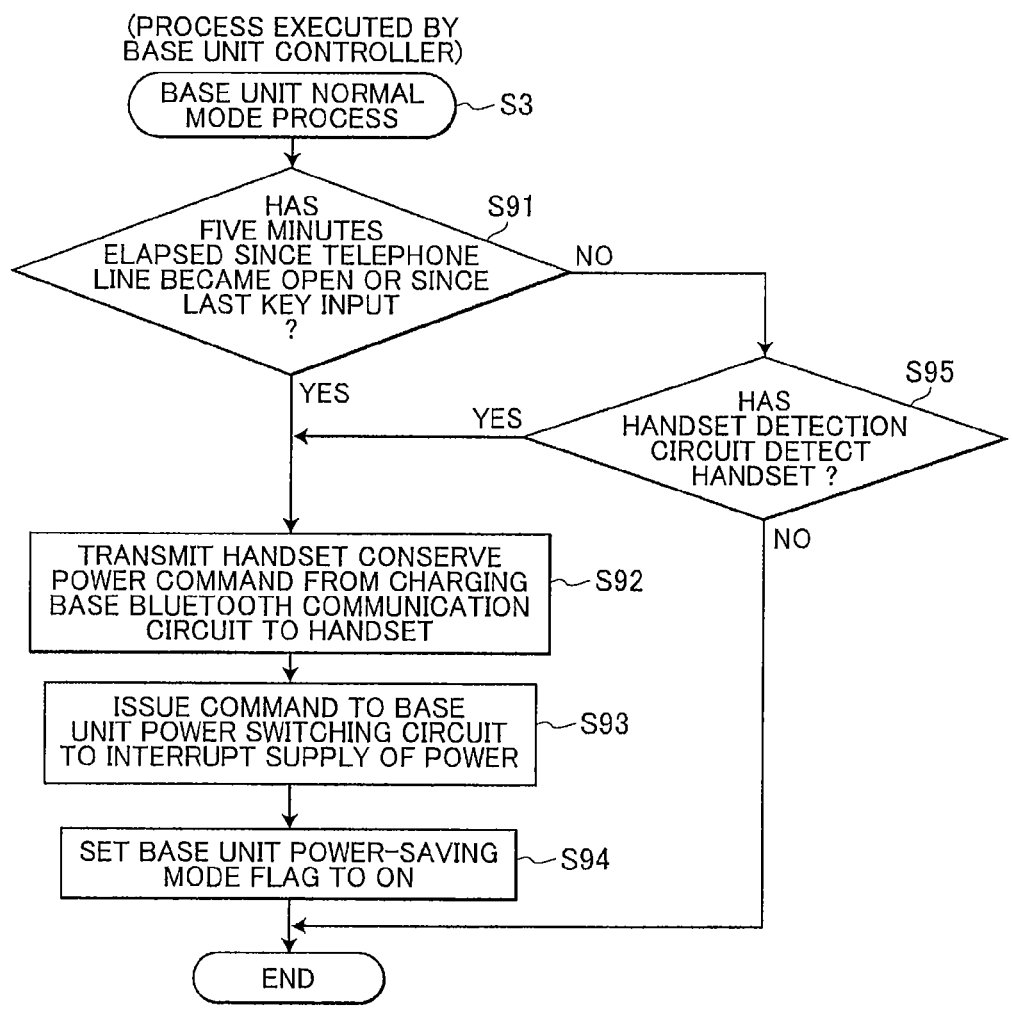
FIG. 12 is a flowchart illustrating steps in a base unit normal mode process executed by the base unit controller of a base unit according to the second embodiment.

Next, a second embodiment of the present invention will be described with reference to FIGS. 11 through 13. FIG. 11 is a block diagram showing the electrical structure of the cordless communication system 101 according to the second embodiment, wherein like parts and components are designated with the same reference numerals to avoid duplicating description.

As shown in FIG. 11, the cordless communication system 101 according to the second embodiment includes a base unit 90 and the handset 60. The base unit 90 is connected to the AC outlet 81 via the AC power code 26. The base unit 90 is integrally configured of the charging base 40 of the first embodiment. That is, the base unit 90 includes the base unit controller 11, the base unit wireless communication device 15, the panel GA 20, the operating key 21, the communication control circuit 22, the base unit power supply circuit 18, the bus line 24, the charging base Bluetooth communication circuit 45, the handset detection circuit 46, and the charging base charging circuit 47. The second embodiment also differs from the first embodiment in that the cordless communication system 101 does not include the base unit power line communication circuit 19, the charging base power line communication circuit 48, and the charging base controller 41. Therefore, the base unit 90 and handset 60 communicate by exchanging commands between the charging base Bluetooth communication circuit 45 in the base unit 90 and the handset communication circuit 68 of the handset 60. Since the handset 60 is identical to that described in the first embodiment, a description of the handset 60 will not be repeated.

In the cordless communication system 101 according to the second embodiment, the charging base Bluetooth communication circuit 45, the handset detection circuit 46, and the charging base charging circuit 47 are connected by bus lines to the bus line 24. When the CPU 12 inputs a command into the charging base Bluetooth communication circuit 45 via the bus line 24, the charging base Bluetooth communication circuit 45 converts the inputted command to a high-frequency current signal that is emitted from an antenna housed in the charging base Bluetooth communication circuit 45. The commands transmitted by the charging base Bluetooth communication circuit 45 include the handset start command and the handset conserve power command.

When a high-frequency current signal received by the antenna is inputted into the charging base Bluetooth communication circuit 45, the charging base Bluetooth communication circuit 45 extracts required commands from the current signal and outputs these commands to the bus line 24 to be received by the CPU 12. The command received by the charging base Bluetooth communication circuit 45 is the base unit start command transmitted from the handset communication circuit 68.

The handset detection circuit 46 outputs a handset detection signal to the bus line 24 to be received by the CPU 12 when the handset 60 is mounted on the charging base 40 and the handset detection circuit 46 detects the handset 60.

The charging base charging circuit 47 is connected to the bus line 24 by a bus line and also connected to the AC outlet 81 by a power feed line (indicated by an arrow with a bold point). When the handset 60 is mounted on the charging base 40, the handset charging circuit 70 is electrically connected to the charging base charging circuit 47. When the handset detection circuit 46 outputs the detection signal to the bus line 24, the CPU 12 receives this signal and issues a command to the charging base charging circuit 47. Upon receiving this command, the charging base charging circuit 47 converts power supplied from the AC outlet 81 to direct current and supplies this current to the handset 60.

In the second embodiment, the base unit controller 11 also executes the main process of the first embodiment as shown in FIG. 2. However, a normal mode process shown in FIG. 12 is executed in S3 instead of the normal mode process in the first embodiment (FIG. 3). A power saving-mode as shown in FIG. 13 is executed in S3 instead of the power-saving mode process in the first embodiment (FIG. 4). FIG. 12 is a flowchart illustrating steps in a base unit normal mode process (S3) executed by the base unit controller 11 of the base unit 90. The base unit controller 11 executes this process after determining in the main process of FIG. 2 that the base unit 90 is in the normal mode based on the setting of the base unit power-saving mode flag 14a being OFF.

In S91 at the beginning of the normal mode process of S3, the base unit controller 11 determines whether five minutes has elapsed since the telephone line became open or since the last key input. Specifically, the CPU 12 begins timing after the CPU 12 detects the telephone line being opened or after the panel GA 20 detects key input. If five minutes has elapsed based on the timing of the CPU 12, indicating that five minutes has elapsed since the telephone line became open or since the last key input, that is, five minutes has elapsed since later one of a time when the telephone line has been opened and a time when the last key has been inputted via the operating key 21 (S91: YES), then in S92 the base unit controller 11 transmits the handset conserve power command via the charging base Bluetooth communication circuit 45 to the handset 60 in order to shift the handset 60 from the normal mode to the power-saving mode.

In S93 the base unit controller 11 issues a command to the base unit power switching circuit 17 for interrupting the supply of power from the base unit power supply circuit 18 to the base unit data wireless communication circuit 16 in order to shift the base unit 90 from the normal mode to the power-saving mode. That is, this command instructs the base unit power switching circuit 17 to interrupt the supply of power from the base unit power supply circuit 18 to the base unit data wireless communication circuit 16. Through the process of S93, the supply of power to the base unit data wireless communication circuit 16 is cut off, disabling wireless communications with the base unit data wireless communication circuit 16. Hence, the supply of power to the base unit data wireless communication circuit 16 can be interrupted by shifting the base unit 90 to the power-saving mode, thereby reducing power consumption in the base unit 90 when the base unit 90 is in the power-saving mode.

In S94 the base unit controller 11 sets the base unit power-saving mode flag 14a in the base unit 90 to ON, indicating that the base unit 90 has been shifted to the power-saving mode, and subsequently ends the base unit normal mode process of S3.

However, if the base unit controller 11 determines in S91 that five minutes has not yet elapsed since the telephone line became open or since the last key input (S91: NO), then in S95 the base unit controller 11 determines whether the handset detection circuit 46 has detected the handset 60. The handset detection circuit 46 detects the handset 60 when the handset 60 is mounted on the charging base 40 configured integrally with the base unit 90. If the handset detection circuit 46 has detected the handset 60 (S95: YES), then the base unit controller 11 proceeds to S92. Thus, in S92 the base unit controller 11 transmits the handset conserve power command from the charging base Bluetooth communication circuit 45 to the handset 60 in order to shift the handset 60 from the normal mode to the power-saving mode.

Subsequently, the base unit controller 11 executes the process in S93 for shifting the base unit 90 to the power-saving mode and the process in S94 for toggling the base unit power-saving mode flag 14a in the base unit 90, after which the base unit controller 11 ends the base unit normal mode process of S3.

However, if the base unit controller 11 determines in S95 that the handset detection circuit 46 has not detected the handset 60 (S95: NO), then the base unit controller 11 simply ends the base unit normal mode process of S3.

Through the normal mode process of S3, if five minutes has elapsed since the telephone line became open or since the last key input, that is, if five minutes has elapsed since later one of a time when the telephone line has been opened and a time when the last key has been inputted via the operating key 21, the base unit controller 11 transmits the handset conserve power command from the charging base Bluetooth communication circuit 45 to the handset 60 in order to shift the handset 60 from the normal mode to the power-saving mode, and the base unit power switching circuit 17 interrupts the supply of power to the base unit data wireless communication circuit 16. Hence, the supply of power to the base unit data wireless communication circuit 16 can be cut off by shifting the base unit 90 into the power-saving mode, thereby reducing power consumption in the base unit 90 when the base unit 90 is in the power-saving mode.

Figure 13:
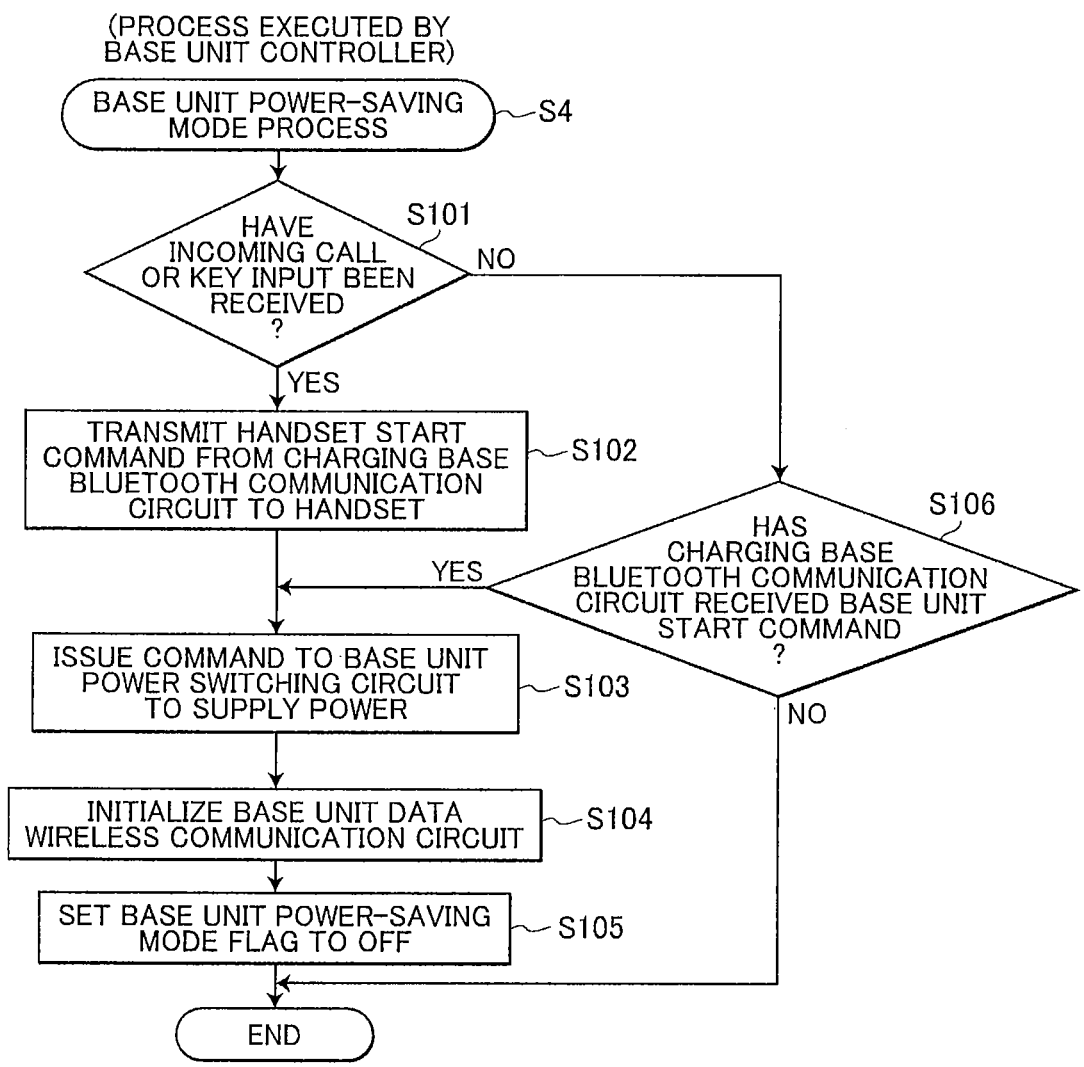
FIG. 13 is a flowchart illustrating steps in a base unit power-saving mode process executed by the base unit controller in the base unit according to the second embodiment.

FIG. 13 is a flowchart illustrating steps in the base unit power-saving mode process of S4 executed by the base unit controller 11 in the base unit 90. The base unit controller 11 executes this process after determining in the main process of FIG. 2 that the base unit 90 is in the power-saving mode based on the base unit power-saving mode flag 14a being set to ON.

In S101 at the beginning of the base unit power-saving mode process of S4, the base unit controller 11 determines whether an incoming call has been received on the telephone line 23 or key input has been detected by the panel GA 20. Specifically, if the communication control circuit 22 detects an incoming call on the telephone line 23 or if the panel GA 20 detects key input (S101: YES), then in S102 the base unit controller 11 transmits the handset start command from the charging base Bluetooth communication circuit 45 to the handset 60 for shifting the handset 60 from the power-saving mode to the normal mode.

In S103 the base unit controller 11 issues a command to the base unit power switching circuit 17 for supplying power from the base unit power supply circuit 18 to the base unit data wireless communication circuit 16 in order to shift the base unit 90 into the normal mode. That is, this command instructs the base unit power switching circuit 17 to supply power from the base unit power supply circuit 18 to the base unit data wireless communication circuit 16. Through the process of S103, power is supplied to the base unit data wireless communication circuit 16. In S104 the base unit controller 11 initializes the base unit data wireless communication circuit 16, enabling wireless communications therewith.

In S105 the base unit controller 11 sets the base unit power-saving mode flag 14a to OFF, indicating that the base unit 90 has been shifted into the normal mode, and subsequently ends the base unit power-saving mode process of S4.

However, if the base unit controller 11 determines in S101 that neither incoming call nor key input has been received (S101: NO), then in S106 the base unit controller 11 determines whether the charging base Bluetooth communication circuit 45 has received the base unit start command for shifting the base unit 90 from the power-saving mode to the normal mode.

If the charging base Bluetooth communication circuit 45 has received the base unit start command (S106: YES), then the base unit controller 11 advances to S103 and issues a command to the base unit power switching circuit 17 for supplying power from the base unit power supply circuit 18 to the base unit data wireless communication circuit 16. That is, the base unit power switching circuit 17 to supply power from the base unit power supply circuit 18 to the base unit data wireless communication circuit 16. In S104 the base unit controller 11 initializes the base unit data wireless communication circuit 16, enabling wireless communications with the same, and in S105 sets the base unit power-saving mode flag 14a to OFF, indicating that the base unit 90 has been shifted to the normal mode. Subsequently, the base unit controller 11 ends the base unit power-saving mode process of S4.

If the base unit controller 11 determines in S106 that the charging base Bluetooth communication circuit 45 has not received the base unit start command (S106: NO), then the base unit controller 11 simply ends the base unit power-saving mode process of S4.

Through the base unit power-saving mode process of S4, the base unit controller 11 can shift the base unit 90 from the power-saving mode to the normal mode, even when the base unit 90 has been shifted to the power-saving mode and the supply of power to the base unit data wireless communication circuit 16 has been cut off, if the communication control circuit 22 detects an incoming call on the telephone line 23 or the panel GA 20 detects key input, or if the charging base Bluetooth communication circuit 45 receives a base unit start command. That is, the base unit controller 11 can reliably shift the base unit 90 from the power-saving mode back to the normal mode when the communication control circuit 22 detects an incoming call on the telephone line 23 or the panel GA 20 detects key input, or if the charging base Bluetooth communication circuit 45 receives the base unit start command, even if the base unit 90 is incapable of wireless communications because the supply of power to the base unit data wireless communication circuit 16 has been interrupted to reduce power consumption in the base unit 90 while the base unit 90 is in the power-saving mode.

In the second embodiment described above, the charging base Bluetooth communication circuit 45 of the base unit 90 transmits the handset conserve power command to the handset 60 for shifting the handset 60 from the normal mode to the power-saving mode and the base unit power switching circuit 17 interrupts the supply of power to the base unit data wireless communication circuit 16 if five minutes has elapsed since the telephone line became open and since the last key input. Therefore, the supply of power to the base unit data wireless communication circuit 16 can be cut off by shifting the base unit 90 into the power-saving mode, thereby reducing the power consumption in the base unit 90 when the base unit 90 is in the power-saving mode.

Further, according to the second embodiment, the base unit 90 can be shifted from the power-saving mode to the normal mode, even when the base unit 90 has been shifted to the power-saving mode in order to interrupt the power supply to the base unit data wireless communication circuit 16, if the communication control circuit 22 detects an incoming call on the telephone line 23 or the communication control circuit 22 detects key input, or if the charging base Bluetooth communication circuit 45 receives a base unit start command. Therefore, even if the supply of power to the base unit data wireless communication circuit 16 is cut off to reduce power consumption in the base unit 90 when the base unit 90 is in the power-saving mode, the base unit 90 can be reliably shifted back to the normal mode, thereby resuming the supply of power to the base unit data wireless communication circuit 16 to enable wireless communications with the handset 60.

While the invention has been described in detail with reference to the above embodiments thereof, it would be apparent to those skilled in the art that various changes and modifications may be made therein without departing from the spirit of the invention.

For example, in the embodiments described above the handset 60 does not transmit the base unit conserve power command for shifting the base unit 10 or 90 from the normal mode to the power-saving mode. However, it is also possible for the CPU 62 to begin timing when wireless communications with the base unit 10 or 90 ends or the handset data wireless communication circuit 66 detects the end of this wireless communication, or when the panel GA 72 detects key input. After a prescribed time has elapsed based on the timing of the CPU 62, the handset communication circuit 68 can transmit the base unit conserve power command and the handset controller 61 can issue a command instructing the handset power switching circuit 67 to interrupt the supply of power from the rechargeable battery 71 to the handset data wireless communication circuit 66. More specifically, the handset power switching circuit 67 is configured to interrupt power supply if five minutes has elapsed after the wireless communication with the base unit 10 or 90 has finished or if five minutes has elapsed after any key input via the operating keys 73. That is, the handset power switching circuit 67 is configured to interrupt this power supply if five minutes has elapsed since later one of a time when the wireless communication has finished and a time when the last key has been inputted via the operating key 73. In this case, the supply of power to the handset data wireless communication circuit 66 can be cut off by shifting the handset 60 into the power-saving mode, thereby reducing power consumption in the handset 60 when the handset 60 is in the power-saving mode. Here, the base unit conserve power command may be transmitted by the handset data wireless communication circuit 66 rather than the handset communication circuit 68.

In S12 the base unit controller 11 may transmit the handset conserve power command from the base unit data wireless communication circuit 16, instead of the base unit power line communication circuit 19, directly toward the handset data wireless communication circuit 66.

Further, in the embodiments described above, the handset detection circuit 46 detects the handset 60 when the handset 60 is mounted on the charging base 40, at which time the charging base Bluetooth communication circuit 45 transmits the handset conserve power command for shifting the handset 60 into the power-saving mode. The handset 60 enters the power-saving mode when the handset communication circuit 68 receives this handset conserve power command. However, the handset controller 61 may be configured to issue a command to the handset power switching circuit 67 for cutting off the power supply from the rechargeable battery 71 to the handset data wireless communication circuit 66 when the charging base detection circuit 69 in the handset 60 detects the charging base 40 as the handset 60 is mounted on the charging base 40. That is, this command to the handset power switching circuit 67 to cut off the power supply from the rechargeable battery 71 to the handset data wireless communication circuit 66. In this case, it is not necessary for the charging base Bluetooth communication circuit 45 to transmit the handset conserve power command when the handset 60 is mounted on the charging base 40, thereby reducing the number of steps in the process for shifting the handset 60 into the power-saving mode.

Further, in the first embodiment described above, the handset 60 is shifted from the power-saving mode to the normal mode when the panel GA 72 detects key input on the handset 60, for example. However, since the handset detection circuit 46 of the charging base 40 no longer detects the handset 60 when the handset 60 is removed from the charging base 40, it is possible to transmit the handset start command from the charging base Bluetooth communication circuit 45 and to transmit the base unit start command from the charging base power line communication circuit 48 when the handset detection circuit 46 no longer detects the handset 60. In this case, the base unit 10 or 90, the charging base 40, and the handset 60 can be switched from the power-saving mode to the normal mode when the handset 60 is removed from the charging base 40.

Further, since the charging base detection circuit 69 of the handset 60 no longer detects the charging base 40 when the handset 60 is removed from the charging base 40, it is possible to transmit the base unit start command from the handset communication circuit 68 and to issue a command to the handset power switching circuit 67 for supplying power from the rechargeable battery 71 to the handset data wireless communication circuit 66 when the charging base detection circuit 69 no longer detects the charging base 40. That is, this command instructs the handset power switching circuit 67 for supplying power from the rechargeable battery 71 to the handset data wireless communication circuit 66. In this case, the base unit 10 or 90, the charging base 40, and the handset 60 can be shifted from the power-saving mode to the normal mode when the handset 60 is removed from the charging base 40.

Further, while the handset conserve power command is transmitted by the base unit power line communication circuit 19 of the base unit 10 in the embodiments described above, this command may be transmitted by the base unit data wireless communication circuit 16 of the base unit 10 instead.

What is claimed is:
1. A cordless communication system comprising:
a base unit that is configured to be connected to a communication network, the base unit comprising:
 a first base unit wireless communicating unit that is configured to implement wireless and bidirectional communications;
 a base unit communicating unit configured to transmit a handset halt signal; and
 a first power line configured to be connected to a commercial power network;
a handset comprising:
 a first handset wireless communicating unit that is configured to communicate bidirectionally and wirelessly with the first base unit wireless communicating unit;
 a second handset wireless communicating unit that is provided independent of the first handset wireless communicating unit and is configured to implement wireless and bidirectional communications;
 a handset switching unit that is configured to switch between a handset normal mode in which power is supplied to both the first handset wireless communicating unit and the second handset wireless communicating unit and a handset power-saving mode in which power to the first handset wireless communicating unit is interrupted and power is supplied to the second handset wireless communicating unit; and
 a handset starting unit that is configured to control the handset switching unit to supply power to the first handset wireless communicating unit in order to switch to the handset normal mode from the handset power-saving mode if the second handset wireless communicating unit receives a handset start signal instructing the handset to cancel the handset power-saving mode during the handset power-saving mode;
a charging base provided independently of the base unit, the charging base comprising:
 a second power line configured to be connected to the commercial power network;

a charging base wireless communicating unit that is configured to wirelessly and bidirectionally communicate with the second handset wireless communicating unit;

a charging unit that is capable of supplying power to the handset for charging the handset when the handset is mounted on the charging base; and a relaying unit that is configured to exchange signals with the base unit communicating unit and the charging base wireless communicating unit in order to relay signals between the base unit communicating unit and the second handset wireless communicating unit, the relaying unit communicating with the base unit communicating unit via the first power line, the second power line, and the commercial power network, wherein the base unit communicating unit is configured to transmit the handset halt signal to the relaying unit via the first power line, the second power line, and the commercial power network, wherein if the relaying unit receives the handset halt signal from the base unit communicating unit via the first power line, the second power line, and the commercial power network, the relaying unit controls the charging base wireless communicating unit to transmit the handset halt signal to the second handset wireless communicating unit, and wherein the handset switching unit switches from the handset normal mode to the handset power-saving mode if the second handset wireless communicating unit receives the handset halt signal transmitted from the charging base wireless communicating unit.

2. The cordless communication system as claimed in claim 1, wherein the base unit further comprises:
a base unit switching unit that is configured to switch between a base unit normal mode in which power is supplied to the first base unit wireless communicating unit and a base unit power-saving mode in which power to the first base unit wireless communicating unit is interrupted;

a communication network communicating unit that is configured to communicate via the communication network and to detect an incoming call from the communication network;

a base unit input detecting unit that is configured to detect an input signal generated with an input device on the base unit; and a base unit starting unit that is configured to control the base unit communicating unit to transmit the handset start signal to the handset via the first power line, the second power line, the commercial power network, and the charging base wireless communicating unit, and to control the base unit switching unit to supply power to the first base unit wireless communicating unit in order to switch to the base unit normal mode from the base unit power-saving mode if the communication network communicating unit has detected an incoming call during the base unit power-saving mode or if the base unit input detecting unit has detected an input operation during the base unit power-saving mode, wherein the second handset wireless communicating unit is configured to communicate bidirectionally and wirelessly with the base unit via the first power line, the second power line, the commercial power network, and the charging base wireless communicating unit.

3. The cordless communication system as claimed in claim 2,
wherein the base unit communicating unit transmits, to the handset via the first power line, the second power line, the commercial power network, and the charging base wireless communicating unit, the handset halt signal instructing the handset to switch to the handset power-saving mode and that to control the base unit switching unit to interrupt power to the first base unit wireless communicating unit in order to switch from the base unit normal mode to the base unit power-saving mode if a prescribed period of time has elapsed since the communication network communicating unit has finished the communication or since the base unit input detecting unit detects a last input signal; and wherein the handset further comprises a handset halting unit that is configured to control the handset switching unit to interrupt power to the first handset wireless communicating unit in order to switch to the handset power-saving mode if the second handset wireless communicating unit has received the handset halt signal.

4. The cordless communication system as claimed in claim 2, wherein:
the charging base further comprises:
a handset detecting unit that is configured to detect the handset when the handset is mounted on the charging base; and a charging base communication controlling unit that is configured to transmit, to the relaying unit, a base unit halt signal instructing the base unit to switch to the base unit power saving mode when the handset detecting unit detects the mounting of the handset; and the base unit further comprises a base unit halting unit that is configured to control the base unit switching unit to interrupt power to the first base unit wireless communicating unit in order to switch to the base unit power-saving mode if the base unit communicating unit has received the base unit halt signal via the relaying unit.

5. The cordless communication system as claimed in claim 2, wherein:
the charging base further comprises:
a handset detecting unit that is configured to detect the handset when the handset is mounted on the charging base; and a charging base communication controlling unit that is configured to transmit, to the charging base unit wireless communicating unit, a handset halt signal instructing the handset to switch to the handset power-saving mode when the handset detecting unit detects the mounting of the handset; and the handset further comprises a handset halting unit that is configured to control the handset switching unit to interrupt power to the first handset wireless communicating unit in order to switch to the handset power-saving mode if the second handset wireless communicating unit has received the handset halt signal.

6. The cordless communication system as claimed in claim 2, wherein:
the base unit communicating unit transmits, to the handset via the first power line, the second power line, the commercial power network, and the charging base wireless communicating unit, the handset halt signal instructing the handset to switch to the handset power-saving mode and to control the base unit switching unit to interrupt power to the first base unit wireless communicating unit in order to switch to the base unit power-saving mode from the base unit normal mode if a prescribed period of time has elapsed since later one of a time when the communication network communicating unit has finished the communication and a time when the base unit input detecting unit has detected a last input signal; and the handset further comprises a handset halting unit that is configured to control the handset switching unit to interrupt power to the first handset wireless communicating unit in order to switch to the handset power-saving mode if the second handset wireless communicating unit has received the handset halt signal.

7. A cordless communication system comprising:
a handset comprising:
   a first handset wireless communicating unit that is configured to implement wireless and bidirectional communications; and
   a second handset wireless communicating unit that is provided independent of the first handset wireless communicating unit and is configured to implement wireless and bidirectional communications;
a base unit that is configured to be connected to a communication network, the base unit comprising:
   a first power line configured to be connected to a commercial power network;
   a base unit communicating unit;
   a base unit wireless communicating unit that is configured to communicate bidirectionally and wirelessly with the first handset wireless communicating unit;
   a base unit switching unit that is configured to switch between a base unit normal mode in which power is supplied to the first base unit wireless communicating unit and a base unit power-saving mode in which power to the first base unit wireless communicating unit is interrupted; and
   a base unit starting unit; and
a charging base provided independently of the base unit, comprising:
   a second power line configured to be connected to the commercial power network;
   a charging base wireless communicating unit that is configured to wirelessly and bidirectionally communicate with the second handset wireless communicating unit;
   a charging unit that is capable of supplying power to the handset for charging the handset when the handset is mounted on the charging base; and
   a relaying unit that is configured to exchange signals with the base unit communicating unit and the charging base wireless communicating unit in order to relay signals between the base unit communicating unit and the second handset wireless communicating unit, the relaying unit communicating with the base unit communicating unit via the first power line, the second power line, and the commercial power network,
wherein the second handset wireless communicating unit is configured to transmit a base unit start signal instructing the base unit to cancel the base unit power-saving mode
wherein if the charging base wireless communicating unit has received the base unit start signal transmitted from the second handset wireless communicating unit, the relaying unit transmits the base unit start signal to the base unit communicating unit via the first power line, the second power line, and the commercial power network, and
wherein if the base unit communicating unit receives the base unit start signal, the base unit starting unit controls the base unit switching unit to supply power to the first base unit wireless communicating unit in order to switch to the base unit normal mode from the base unit power-saving mode.

8. The cordless communication system as claimed in claim 7, wherein the handset further comprises:
   a handset switching unit that is configured to switch between a handset normal mode in which power is supplied to the first handset wireless communicating unit and a handset power-saving mode in which power to the first handset wireless communicating unit is interrupted;
   a handset input detecting unit that is configured to detect an input signal generated with an input device on the handset; and
   a handset starting unit that is configured to control the first handset wireless communicating unit to transmit the base unit start signal and to control the handset switching unit to supply power to the first handset wireless communicating unit in order to switch to the handset normal mode from the handset power-saving mode if the handset input detecting unit has detected an input operation during the handset power-saving mode.

9. The cordless communication system as claimed in claim 8, wherein the handset further comprises:
   a wireless communication detecting unit that is configured to detect wireless communications from the base unit; and
   a handset halting unit that is configured to control at least one of the handset wireless communicating unit and the second handset wireless communicating unit to transmit, to the base unit, a base unit halt signal instructing the base unit to switch to the base unit power-saving mode and to control the handset switching unit to interrupt power to the first handset wireless communicating unit in order to switch to the handset power-saving mode if a prescribed period of time has elapsed after the first handset wireless communication unit ends wireless communications with the base unit or if a prescribed period of time has elapsed since the handset input detecting unit has detected a last input signal; and
wherein the base unit further comprises a base unit halting unit that is configured to control the base unit switching unit to interrupt power to the first base unit wireless communicating unit in order to switch to the base unit power-saving mode if at least one of the charging base wireless communicating unit and the first base unit wireless communicating unit has received the base unit halt signal.

10. The cordless communication system as claimed in claim 8, wherein:
the charging base further comprises:
   a handset detecting unit that is configured to detect the handset when the handset is mounted on the charging base; and
   a charging base communication controlling unit that is configured to transmit, to the relaying unit, a base unit halt signal instructing the base unit to switch to the base unit power-saving mode when the handset detecting unit detects the mounting of the handset; and
the base unit further comprises a base unit halting unit that is configured to control the base unit switching unit to interrupt power to the first base unit wireless communicating unit in order to switch to the base unit power-saving mode if the base unit communicating unit has received the base unit halt signal via the relaying unit.

11. The cordless communication system as claimed in claim 8, wherein:
- the charging base further comprises:
    - a handset detecting unit that is configured to detect the handset when the handset is mounted on the charging base; and
    - a charging base communication controlling unit that is configured to transmit, to the second base unit wireless communicating unit, a handset halt signal instructing the handset to switch to the handset power-saving mode when the handset detecting unit detects the mounting of the handset; and
- the handset further comprises a handset halting unit that is configured to control the handset switching unit to interrupt power to the first handset wireless communicating unit in order to switch to the power-saving mode if the base unit communicating unit has received the handset halt signal.

12. The cordless communication system as claimed in claim 8, wherein:
- the handset further comprises:
    - a wireless communication detecting unit that is configured to detect wireless communications from the base unit; and
    - a handset halting unit that is configured to control at least one of the first handset wireless communicating unit and the second handset wireless communicating unit to transmit, to the base unit, a base unit halt signal instructing the base unit to switch to the base unit power-saving mode and to control the handset switching unit to interrupt power to the first handset wireless communicating unit in order to switch to the handset power-saving mode if a prescribed period of time has elapsed since a later one of a time when the first handset wireless communication unit ends wireless communications with the base unit and a time when the handset input detecting unit has detected a last input signal; and
- the base unit further comprises a base unit halting unit that is configured to control the base unit switching unit to interrupt power to the first base unit wireless communicating unit in order to switch to the base unit power-saving mode if at least one of the charging base wireless communicating unit and the first base unit wireless communicating unit has received the base unit halt signal.

* * * * *